US011982266B2

(12) United States Patent
Lee et al.

(10) Patent No.: US 11,982,266 B2
(45) Date of Patent: May 14, 2024

(54) COMPRESSOR

(71) Applicant: LG Electronics Inc., Seoul (KR)

(72) Inventors: Jongchan Lee, Seoul (KR); Sunghyun Ki, Seoul (KR); Hyeongjun Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 146 days.

(21) Appl. No.: 17/592,916

(22) Filed: Feb. 4, 2022

(65) Prior Publication Data

US 2022/0364553 A1 Nov. 17, 2022

(30) Foreign Application Priority Data

May 14, 2021 (KR) ........................ 10-2021-0062896

(51) Int. Cl.
*F04B 39/00* (2006.01)
*F04B 35/04* (2006.01)
(Continued)

(52) U.S. Cl.
CPC ...... *F04B 39/0027* (2013.01); *F04B 39/0055* (2013.01); *F04B 39/0061* (2013.01); *F04B 39/0066* (2013.01); *F04B 39/0072* (2013.01); *F04B 39/0088* (2013.01); *F04B 39/0292* (2013.01); *F04B 39/10* (2013.01); *F04B 39/121* (2013.01); *F04B 35/045* (2013.01);
(Continued)

(58) Field of Classification Search
CPC .............. F04B 39/0027; F04B 39/0055; F04B 39/0066; F04B 39/0088; F04B 39/0061
See application file for complete search history.

(56) References Cited

U.S. PATENT DOCUMENTS 6,422,833 B1 * 7/2002 Park .................... F04B 39/0027 417/415
9,951,765 B2 * 4/2018 Ki ........................... F04B 37/00
(Continued)

FOREIGN PATENT DOCUMENTS

KR 10-0314059 11/2001
KR 10-2004-0104758 12/2004
(Continued)

OTHER PUBLICATIONS

Notice of Allowance in Korean Appln. No. 10-2021-0062896, dated Jan. 19, 2023, 6 pages.
(Continued)

*Primary Examiner* — Essama Omgba
*Assistant Examiner* — Geoffrey S Lee
(74) *Attorney, Agent, or Firm* — Fish & Richardson P.C.

(57) ABSTRACT

A compressor includes: a case, a compression unit that is provided inside the case and that includes a cylinder and a piston configured to reciprocate inside the cylinder to compress refrigerant, a driving unit that includes a stator disposed inside the case and a plurality of permanent magnets configured to reciprocate with respect to the stator and that is configured to provide a driving force to the compression unit, and a resonator that is configured to reduce noises generated while the compression unit is operated, that is disposed between the compression unit and an inner surface of the case facing the compression unit in an axial direction, and that is spaced apart from the compression unit.

19 Claims, 16 Drawing Sheets

(51) Int. Cl.

| | |
|---|---|
| ***F04B 39/02*** | (2006.01) |
| ***F04B 39/10*** | (2006.01) |
| ***F04B 39/12*** | (2006.01) |

(52) U.S. Cl.

CPC ....... *F05B 2210/12* (2013.01); *F05B 2210/14* (2013.01); *F05B 2260/962* (2013.01); *F05B 2260/964* (2013.01); *F05B 2280/6013* (2013.01)

(56) References Cited

U.S. PATENT DOCUMENTS

| | | | | |
|---|---|---|---|---|
| 2001/0021350 | A1* | 9/2001 | Kim | F04B 39/121 417/363 |
| 2004/0213682 | A1* | 10/2004 | Seo | F04B 39/121 417/363 |
| 2006/0292023 | A1* | 12/2006 | Kim | F04B 39/0027 417/572 |
| 2009/0283356 | A1* | 11/2009 | Tsugihashi | G10K 11/172 181/207 |
| 2010/0260629 | A1* | 10/2010 | Kang | F04B 39/0061 417/312 |
| 2015/0184651 | A1* | 7/2015 | Ki | F04B 39/0027 417/349 |
| 2015/0377228 | A1* | 12/2015 | Ki | G10K 11/16 92/163 |
| 2017/0321937 | A1* | 11/2017 | Lee | F04B 35/045 |
| 2018/0135612 | A1* | 5/2018 | Bae | F04B 39/0005 |
| 2019/0032649 | A1* | 1/2019 | Roh | F04B 39/123 |
| 2019/0309743 | A1* | 10/2019 | Kim | F04B 39/14 |
| 2022/0220953 | A1* | 7/2022 | Noh | F04B 35/045 |

FOREIGN PATENT DOCUMENTS

| | | |
|---|---|---|
| KR | 100911840 | 8/2009 |
| KR | 10-2016-0147938 | 12/2016 |
| KR | 10-2018-0040791 | 4/2018 |
| KR | 10-2018-0053859 | 5/2018 |
| KR | 2018-0092384 | 8/2018 |
| KR | 102034301 | 10/2019 |
| KR | 10-2020-0109115 | 9/2020 |
| KR | 10-2021-0039110 | 4/2021 |

OTHER PUBLICATIONS

Office Action in Korean Appln. No. 10-2021-0062896, dated Sep. 29, 2022, 10 pages (with English translation).

Office Action in Chinese Appln. No. 202210105282.6, dated Aug. 19, 2023, 22 pages (with English translation).

* cited by examiner

COMPRESSOR

CROSS-REFERENCE TO RELATED APPLICATION

Pursuant to 35 U.S.C. § 119(a), this application claims the benefit of the earlier filing date and the right of priority to Korean Patent Application No. 10-2021-0062896, filed on May 14, 2021, the contents of which is incorporated by reference herein in its entirety.

TECHNICAL FIELD

The present disclosure relates to a compressor.

BACKGROUND

As is well known, a compressor is an apparatus that receives power from a power generating device such as a motor or a turbine and compresses a working fluid such as air or refrigerant (refrigerant gas). In detail, compressors are widely applied to industrial fields and household appliances, particularly, steam compression refrigeration cycles (hereinafter, referred to as 'refrigeration cycles'), and the like.

These compressors may be classified into a reciprocating compressor, a rotary compressor, and a scroll compressor according to a method of compressing refrigerant.

Such a compressor generally includes a shell or case (hereinafter, referred to as 'case') defining a hermetic space, a compression unit provided inside the case, and a driving unit (or motor unit) providing a driving force to the compression unit.

The compression unit includes a compression space, a suction port and a discharge port communicating with the compression space, a suction valve for opening and closing the suction port, and a discharge valve for opening and closing the discharge port.

The compressor sucks gas or refrigerant (hereinafter, referred to as 'gas') into the case through a suction pipe. The sucked gas is introduced into the compression space through the suction port and compressed, and the compressed gas then flows into a discharge pipe through the discharge port so as to be discharged out of the case.

However, in the related art compressor, vibration and noise of moving parts are generated during the suction, compression, and discharge of the gas.

In particular, noise is greatly increased when the compressed gas is discharged. Thus, the compressor includes a discharge muffler provided in a discharge-side flow path of the compression unit to attenuate the noise generated during the discharge of the gas.

The compressor also includes a suction muffler provided in a suction-side flow path of the compression unit to attenuate noise generated when gas to be compressed is sucked into the compression unit.

On the other hand, in some of these related art compressors, a soundproofing member is installed on an inner surface of the case to reduce noise.

However, some of the related art compressors having such soundproofing member employ a fibrous soundproofing member, which is contaminated due to oil inside the case, resulting in poor performance.

In addition, in the related art compressors each provided with the soundproofing member, a sound-absorbing member made of fibers or foamed fibers is disposed on the entire inner surface of the case, and a sound-absorbing structure made of a metal or non-metal material is disposed on an outer surface of the sound-absorbing member, and a thin metal plate is disposed on an outer surface of the sound-absorbing structure. This configuration is complicated and is difficult to be installed.

In addition, the soundproofing member having such configuration is not easy to be applied to a small compressor with a relatively small inner space of the case.

Since the sound-absorbing member, the sound-absorbing structure, and the thin metal plate are installed on the inner surface of the case, there is a problem that a manufacturing cost is relatively significantly increased.

In addition, the method of reducing noise of the compressor by installing the sound-absorbing member, the sound-absorbing structure, and the metal thin plate on the inner surface of the case can attenuate an entire noise (frequency) band generated when the compressor is driven to a certain extent. However, when it is desired to attenuate noise of a specific frequency band, the method is insufficient in terms of economical efficiency and/or operation efficiency.

PRIOR ART LITERATURE

Patent Literature (Patent Literature 1) KR100911840 B1

SUMMARY

Therefore, an aspect of the present disclosure is to provide a compressor capable of suppressing an increase in noise in a case due to resonance.

Another aspect of the present disclosure is to provide a compressor capable of suppressing an increase in axial length due to installation of a resonator.

Still another aspect of the present disclosure is to provide a compressor capable of reducing noise of a specific frequency (band) generated when the compression unit is driven.

The compressor according to the present disclosure for solving the above problems may be characterized by including a resonator disposed in a case at a position spaced apart from a compression unit in an axial direction.

Specifically, a compression unit and a driving unit for compressing gas (refrigerant) may be provided inside a case, and a resonator may be provided on an inner wall of one end portion of the case to be spaced apart from the compression unit in the axial direction so as to absorb noises emitted in the axial direction during an operation of the compression unit, thereby preventing an increase in noises inside the case due to resonance.

The resonator may include a body forming a cavity therein, and a hole formed through the body to communicate with the cavity.

The compressor may include a case, a compression unit provided inside the case and provided with a cylinder and a piston reciprocating inside the cylinder to compress refrigerant, a driving unit provided with a stator disposed inside the case and permanent magnets reciprocating with respect to the stator, and providing a driving force to the compression unit, and a resonator configured to reduce noises generated while the compression unit is operated, and the resonator may be disposed between the compression unit and an inner surface of the case facing the compression unit in an axial direction to be spaced apart from the compression unit.

Accordingly, noises generated during the operation of the compression unit can be absorbed by the resonator, so as to prevent noise reflection, which may result in suppressing an increase in noises due to the noise reflection and resonance.

The case may be implemented in a cylindrical shape.

The case may include a case body in a cylindrical shape and covers for blocking both end portions of the case body. The covers each may be formed in a disk shape.

The case may have a length longer than a diameter.

The case may be installed so that a lengthwise direction of the case is in parallel with a horizontal direction.

This may result in remarkably reducing a height of an installation space in which the compressor is installed.

When the compressor according to the implementation is installed in a machine room of a refrigerator, a height of the machine room can be significantly lowered.

Accordingly, in the refrigerator with the compressor according to the implementation, the height of the machine room in which the compressor is installed can be significantly lowered even without increasing a size of a cabinet of the refrigerator, thereby remarkably increasing a food accommodation space (storage space) of the refrigerator.

A plurality of legs may be provided on a lower portion of the case to fix the case to an object.

In the compressor according to the implementation, a so-called cavity resonance mode of the case, in which noises generated during the operation of the compression unit is moved in the case in the axial direction and amplified by being reflected from a cover disposed on an end portion of the case, can be suppressed by the resonator. Accordingly, resonance of noise of a specific frequency (band) (especially, noise of a low frequency due to pressure pulsation) inside the case of the compressor can be suppressed, thereby significantly reducing the noises generated in the case of the compressor.

The compression unit may include a cylinder and a piston reciprocating within the cylinder.

The cylinder may have a cylindrical shape.

The cylinder may have a cylindrical shape with both ends open.

The cylinder may be disposed in the case such that its center line is disposed in the lengthwise direction of the case.

A piston may be provided inside the cylinder.

The piston may have a cylindrical shape with one end portion blocked.

The piston may have a cylindrical shape.

The piston may have a head formed on its one end portion.

Suction ports through which gas is sucked may be formed through the head of the piston.

A suction valve for opening and closing the suction ports may be provided at the head of the piston.

The piston may have a length such that its head-side end is accommodated inside the cylinder and an opposite end of the head is disposed outside the cylinder.

The piston may be configured to reciprocate between a top dead center at which the head is inserted to the maximum depth into the cylinder and a bottom dead center spaced apart from the top dead center to the maximum in the axial direction.

A discharge valve may be disposed at one end portion of the cylinder to open and close the one end portion of the cylinder.

Here, the discharge valve may have a disk shape, and have an outer diameter to corresponding to an inner diameter of the cylinder.

The discharge valve may block the one end portion of the cylinder when inserted into the one end portion of the cylinder, and open the one end portion by being spaced apart from the one end portion of the cylinder in the axial direction.

Here, the one end portion of the cylinder opened and closed by the discharge valve may be referred to as a discharge port in that compressed gas is discharged.

A compression space may be defined between the discharge valve and the suction valve along the axial direction.

The discharge valve may block the end portion of the cylinder and open the cylinder when internal pressure of the compression space reaches a preset pressure.

The suction valve may open and close the suction ports while its one region moves along the axial direction.

The discharge valve may open and close the discharge port while its one region moves along the axial direction.

The compression space may be contracted when the piston moves to the top dead center.

The compression space may be expanded when the piston moves from the top dead center to the bottom dead center.

The suction valve may close the suction ports when the compression space is contracted.

The discharge valve may close the discharge port when the compression space is contracted.

The suction valve may open the suction ports when the compression space is expanded.

The discharge valve may close the discharge port when the compression space is expanded.

Accordingly, gas sucked into the compression space when the suction ports are open may be compressed by the contraction of the compression space.

When the internal pressure of the compression space exceeds a preset pressure, the discharge valve may open the discharge port so that the compressed gas can be discharged through the discharge port.

A discharge space through which compressed gas is discharged may be defined in one side (an opposite side to the compression space) of the discharge valve along the axial direction.

A frame may be provided at an outer side of the cylinder.

In one implementation of the present disclosure, the compression unit may include a discharge cover surrounding the discharge port through which compressed refrigerant is discharged.

The discharge space through which the compressed gas is discharged may be defined in the discharge cover.

The discharge cover may be provided at one side (opposite side to the compression space) of the cylinder and the frame.

The cylinder may be provided with a nozzle for spraying gas into a gap between an inner surface of the cylinder and an outer surface of the piston.

Accordingly, friction between the cylinder and the piston can be suppressed, so that an occurrence of forced wear of the cylinder and the piston can be suppressed.

The nozzle may communicate with the discharge space.

Thus, the compressed gas in the discharge space may be provided into the nozzle.

The driving unit may include a stator and a mover reciprocating relative to the stator.

The mover may be provided with permanent magnets.

The mover may be connected to the piston.

A resonance sparing that can be expanded and contracted in the axial direction may be provided on one side of the mover.

This may facilitate the reciprocating motion of the mover and the piston.

The stator may include an inner stator provided at an outer side of the frame and an outer stator concentrically disposed at an outer side of the inner stator.

The permanent magnets may be disposed between the inner stator and the outer stator along the radial direction, and reciprocate in the axial direction by interaction between a magnetic field generated in the inner stator and a magnetic field generated in the outer stator.

In one implementation of the present disclosure, the resonator may be formed of a synthetic resin member or steel. The resonator may be formed of a stainless member.

This may result in preventing performance of the resonator from being deteriorated due to a contact between the resonator and oil in the case of the compressor and due to contamination of the resonator caused by the contact with the oil.

The resonator may be coupled to an inner wall of one end portion of the case by a fixing member.

Accordingly, a welding operation can be excluded upon coupling the resonator and the case to each other, thereby suppressing bad effects caused due to the welding.

The resonator may include a fixing member coupling portion formed therethrough such that the fixing member is coupled.

This may result in exclusion of a welding operation upon coupling the resonator and the case to each other.

In one implementation of the present disclosure, one end portion of the discharge cover may protrude toward one end (cover) of the case in the axial direction, and the resonator may be provided with a recess portion recessed to accommodate one end region of the discharge cover.

This may prevent an increase in an axial length of the compressor due to an installation of the resonator.

One end portion of the discharge cover may have a substantially cylindrical shape, and the recess portion may have an increased diameter compared to an outer surface of the discharge cover.

In one implementation of the present disclosure, the resonator may have a cylindrical shape having an outer diameter reduced compared to an inner diameter of the case.

The resonator may have in the axial direction one plate surface coming in contact with the case (cover) and another plate surface having a hole formed through the another plate surface in the axial direction toward the compression unit.

The recess portion may be recessed into a center of the resonator in the axial direction.

Accordingly, the resonator and the discharge cover may be aligned in the axial direction.

The fixing member coupling portion may be formed through the recess portion along the axial direction.

This may result in suppressing an increase in an external size of the resonator due to the formation of the fixing member coupling portion.

The fixing member may be implemented as a bolt or screw having a male screw portion.

The case (cover) may be provided with a female screw to which the fixing member can be screwed.

In one implementation of the present disclosure, a supporter may be provided on an end portion of the discharge cover to support the end portion of the discharge cover.

The supporter may be provided on the end portion of the discharge cover accommodated in the recess portion of the resonator.

As the supporter and the resonator overlap each other in the axial direction, an increase in the size of the compressor in the axial direction due to the installation of the supporter and the resonator can be suppressed.

The supporter may be coupled to a lower portion of the discharge cover.

The supporter may include a contact portion in contact with the end portion of the discharge cover, and rod parts protruding from the contact portion toward an inner wall (inner surface) of the case to form a preset internal angle.

The rod parts may form an obtuse angle with the contact portion.

Accordingly, the discharge cover can be effectively supported by the supporter when the discharge cover moves up and down and horizontally (or in a transverse direction).

The contact portion may come in contact with a bottom surface of the discharge cover and extend horizontally, and the rod parts may protrude from both ends of the contact portion to be downwardly inclined.

A buffer support member for buffering and supporting the supporter may be provided between the supporter and the case.

The buffer support member may be implemented as a compression coil spring.

The resonator may be provided with a supporter accommodating portion in which the supporter is accommodated.

In one implementation of the present disclosure, the body may include an upper body located above the supporter accommodating portion and a lower body located below the supporter accommodating portion.

Cavities may be formed in the upper body and the lower body, respectively.

A first cavity may be formed in the upper body and a second cavity may be formed in the lower body.

A first hole communicating with the first cavity may be formed through the upper body.

A second hole communicating with the second cavity may be formed through the lower body.

The first hole and the second hole may be formed to have different sizes, respectively.

Accordingly, noises of different frequencies (frequency bands) can be reduced, respectively.

In one implementation of the present disclosure, the first cavity and the first hole may be configured to attenuate noise at a frequency of 250 Hz.

In one implementation of the present disclosure, the second cavity and the second hole may be configured to attenuate noise at a frequency of 315 Hz.

In one implementation of the present disclosure, the cavity of the resonator may include a first cavity and a second cavity formed in the upper body to be partitioned from each other, and a third cavity formed in the lower body.

The hole may include a first hole communicating with the first cavity, a second hole communicating with the second cavity, and a third hole communicating with the third cavity.

In one implementation of the present disclosure, the third hole may have a smallest first diameter, the first hole may have a second diameter larger than the first diameter, and the second hole may have a third diameter larger than the second diameter.

Accordingly, noises of different frequencies (frequency bands) can be reduced, respectively.

In more detail, the third cavity and the third hole may reduce noise at a frequency of 200 Hz.

The second cavity and the second hole may reduce noise at a frequency of 250 Hz.

The third cavity and the third hole may reduce noise at a frequency of 315 Hz.

In one implementation of the present disclosure, the first cavity and the second cavity may be symmetrical with each other and the first hole and the second hole may be symmetrical with each other.

The first cavity and the second cavity may be formed to have the same volume.

The first hole and the second hole may be formed to have the same diameter.

Accordingly, the sound absorption coefficient of a specific frequency (band) inside the case of the compressor can be significantly increased, so that noise can be reduced by that much.

More specifically, the first cavity, the first hole, the second cavity, and the second hole can reduce noise at a frequency of 250 Hz.

The third cavity and the third hole may reduce noise at a frequency of 315 Hz.

In one implementation of the present disclosure, a cavity having a hole with a smallest inner size among the plurality of holes may protrude further toward the compression unit in the axial direction compared to the other cavities.

In one implementation of the present disclosure, a movement guide for suppressing the end portion of the discharge cover from moving in a radial direction may be disposed in the recess portion.

In one implementation of the present disclosure, a fixing member insertion portion communicating with the fixing member coupling portion may be formed through the movement guide such that the fixing member is inserted.

In one implementation of the present disclosure, the movement guide may include an outer guide formed in a cap-like shape having one side open and coupled into the recess portion, and an inner guide having a size more reduced than the outer guide and coupled to the end portion of the discharge cover to be disposed inside the outer guide.

The outer guide may be coupled into the recess portion such that its opening faces the discharge cover.

The inner guide may have a cap-like shape with one side open, and the opening may be coupled to the end portion of the discharge cover to face the outer guide.

In one implementation of the present disclosure, the compressor may include a buffer member coupled to the discharge cover and buffering the discharge cover by applying resistance when the discharge cover moves in the radial direction.

The buffer member may include a buffer member body having a plate shape, a discharge cover coupling portion provided in a center of the buffer member body and coupled to the discharge cover, and an elastically-deformable portion connecting the buffer member body and the discharge cover coupling portion to each other and elastically deformable.

A coupling portion to be coupled into the case may be provided on an outer edge of the buffer member body.

A buffer member coupling portion to which the buffer member is coupled may be provided in the case.

In one implementation of the present disclosure, the cavity may include first to fourth cavities formed in the body and partitioned from each other along the circumferential direction, and the hole may include first to fourth holes communicating with the first to fourth cavities, respectively.

In one implementation of the present disclosure, the first to fourth holes may be formed to have different sizes.

Accordingly, noises of different four frequencies (frequency bands) can be reduced, respectively.

In one implementation of the present disclosure, a cavity having a hole with a smallest inner size among the holes may protrude further toward the compression unit in the axial direction compared to the other cavities.

Specifically, the first cavity having the first hole having the smallest size among the first to fourth holes may protrude more toward the compression unit compared to the second to fourth cavities along the axial direction.

The cavity more protruding toward the compression unit can increase in volume (sound absorption coefficient) by that much, so that noise of a relatively low frequency (band) can be reduced by that much.

More specifically, the first hole may have a smallest size, the second hole may have a size larger than the first hole, the third hole may have a size larger than the second hole, and the fourth hole may have a size larger than the third hole, then, the first cavity and the first hole may attenuate noise at a frequency of 200 Hz, the second cavity and the second hole may attenuate noise at a frequency of 250 Hz, and the third cavity and the third hole may attenuate noise at a frequency of 315 Hz, and the fourth cavity and the fourth hole may attenuate nose at a frequency of 400 Hz.

In one implementation of the present disclosure, the first cavity, the first hole, the second cavity, and the second hole may have a symmetrical structure, and the third cavity, the third hole, the fourth cavity, and the fourth hole may have a symmetrical structure.

Accordingly, noises of different two frequencies (frequency bands) can be significantly reduced, respectively.

More specifically, the first cavity and the first hole, and the second cavity and the second hole may attenuate noise at a frequency of 250 Hz, and the third cavity and the third hole, and the fourth cavity and the fourth hole may attenuate noise at a frequency of 315 Hz.

In one implementation of the present disclosure, the cavity may include first to third cavities partitioned from each other along the circumferential direction, and the hole may include first to third holes communicating with the first to third cavities, respectively.

This may result in attenuating noises of different frequencies, respectively.

In one implementation of the present disclosure, when the third hole has a smaller size than the first and second holes, the third cavity may have a larger volume than the first and second cavities.

In one implementation of the present disclosure, the first cavity, the second cavity, and the third cavity may be partitioned to have the same internal angle (120 degrees) between both end portions in the circumferential direction.

The third hole of the third cavity may have a smaller size than the first hole of the first cavity and the second hole of the second cavity, and the third cavity may further protrude toward the compression unit in the axial direction compared to the first cavity and the second cavity.

As described above, according to one implementation of the present disclosure, a resonator may be disposed in a case at a position spaced apart from a compression unit in an axial direction, thereby suppressing an increase in noise in the case due to resonance.

The resonator may include a body forming a cavity and a hole formed through the body toward the compression unit, so as to significantly reduce noise of a specific frequency (band).

The resonator may be coupled to the case by screws, and accordingly a welding operation can be excluded upon installing the resonator, thereby suppressing adverse effects due to the welding.

The resonator may include a recess portion for accommodating a discharge cover of the compression unit, thereby preventing an increase in axial length of the compressor due to the installation of the resonator.

The resonator may include a supporter accommodating portion for accommodating a supporter of the discharge cover, and thus the resonator and the supporter can be disposed to overlap each other in the axial direction, thereby preventing an increase in length of the case due to the installation of the resonator.

A plurality of cavities and holes partitioned from one another may be symmetrically formed with one another, so as to significantly increase a sound absorption coefficient of noise at a specific frequency (band), thereby reducing noise.

Holes of a plurality of cavities may have different sizes, thereby reducing noises of different frequencies (frequency bands).

A cavity having a hole with a relatively small size among the plurality of cavities may further protrude in the axial direction, thereby improving noise reduction characteristics of noises at relatively low frequencies.

A movement guide for preventing movement of the discharge cover may be accommodated in the recess portion of the resonator, such that the resonator and the movement guide can overlap each other in the axial direction, thereby preventing an increase in size of the compressor (case) in the axial direction due to the installation of the resonator.

The movement guide may include an outer guide and an inner guide concentrically disposed with each other, and the outer guide may be coupled to the resonator by a fixing member, thereby excluding a welding operation upon installing the resonator and the movement guide. This may result in preventing an occurrence of adverse effects due to the welding.

The movement guide may be accommodated in the recess portion formed in a center of the resonator and a plurality of cavities partitioned from one another may be formed around the recess portion, thereby improving noise reduction characteristics in the case.

The resonator may be formed of a synthetic resin member or steel to suppress contamination of the resonator due to contact with oil inside the case, thereby preventing performance of the resonator from being deteriorated due to the contamination.

DETAILED DESCRIPTION

Hereinafter, implementations disclosed in this specification will be described in detail with reference to the accompanying drawings. In this specification, the same or equivalent components may be provided with the same or similar reference numbers even in different implementations, and description thereof will not be repeated. A singular representation may include a plural representation unless it represents a definitely different meaning from the context. In describing the present invention, if a detailed explanation for a related known technology or construction is considered to unnecessarily divert the gist of the present disclosure, such explanation has been omitted but would be understood by those skilled in the art. It should be noted that the attached drawings are provided to facilitate understanding of the implementations disclosed in this specification, and should not be construed as limiting the technical idea disclosed in this specification by the attached drawings.

Figure 1:
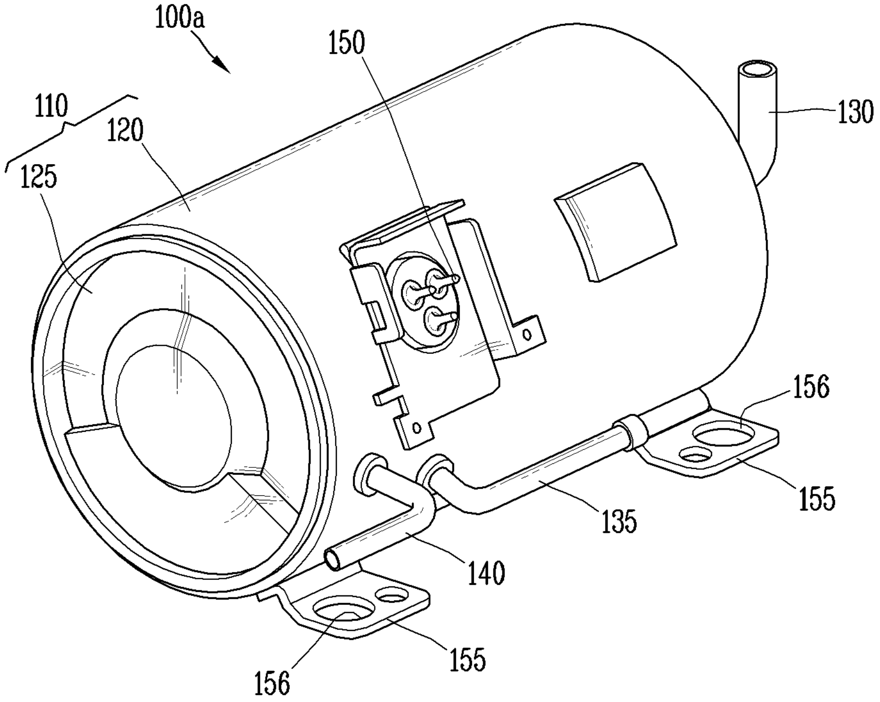
FIG. 1 is a perspective view of a compressor in accordance with one implementation of the present disclosure.
Figure 2:
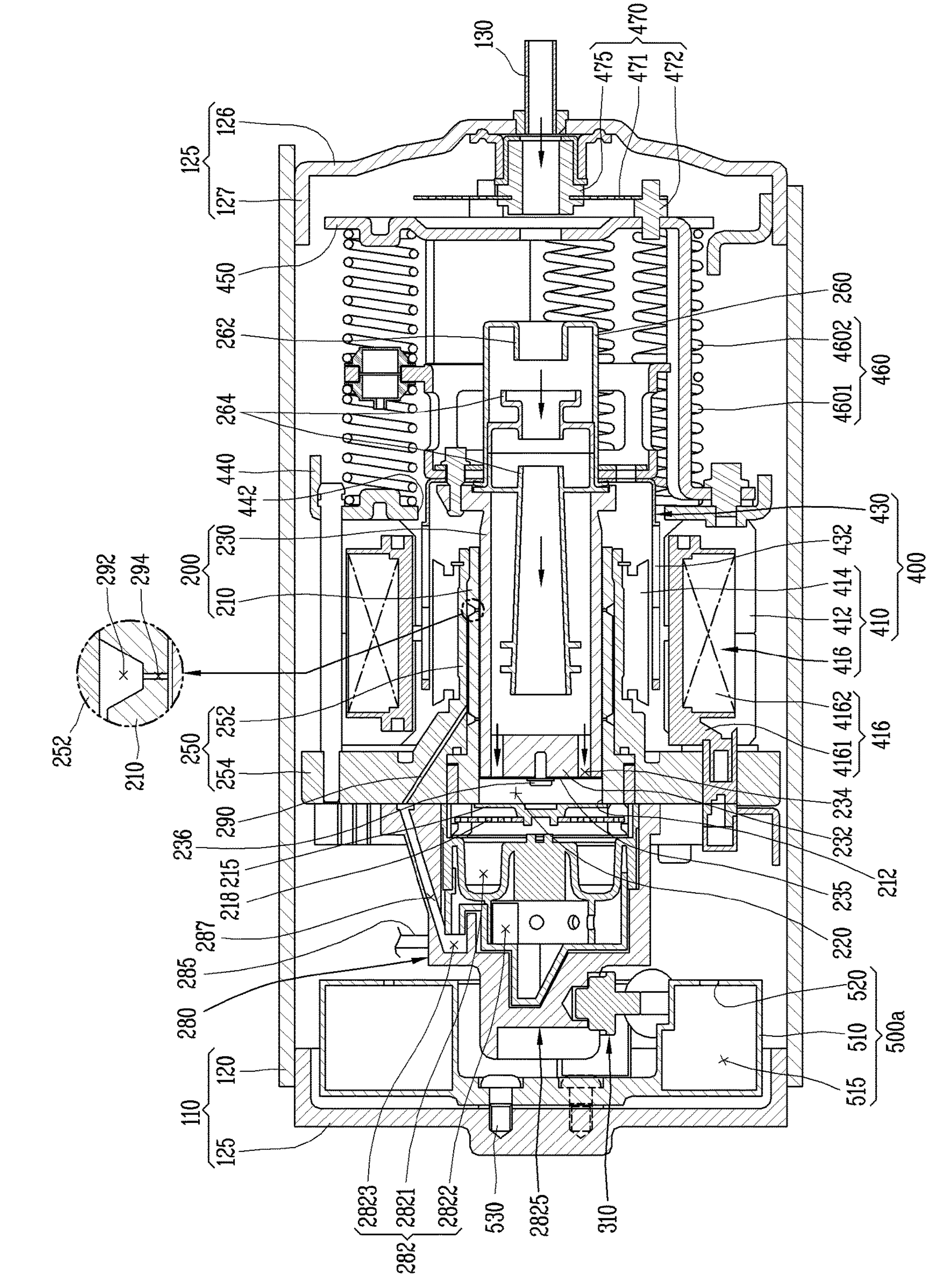
FIG. 2 is a sectional view of the compressor of FIG. 1.

FIG. 1 is a perspective view of a compressor in accordance with one implementation of the present disclosure, and FIG. 2 is a sectional view of the compressor of FIG. 1. As illustrated in FIGS. 1 and 2, a compressor 100*a* according to this implementation may include a case 110, a compression unit 200, a driving unit 400, and a resonator 500*a*.

The case 110 may have a substantially cylindrical shape. The case 110 may have a length longer than its diameter. The compressor 100*a* according to this implementation may be specifically implemented as, for example, a compressor 100*a* having a compact structure with a length of about 30 cm and a diameter of about 10 cm.

The case 110 may define an inner hermetic accommodation space.

The case 110 may include, for example, a case body 120 having at least one side open and a cover 125 coupled to close the opening of the case body 120.

The case body 120 may be formed in a cylindrical shape with both sides open, for example.

The cover 125 may be provided in plurality coupled to both end portions of the case body 120.

The cover 125 may include, for example, a disk portion 126 having a disk shape and a skirt portion 127 protruding from an edge of the disk portion 126 in an axial direction and extending in a circumferential direction.

The skirt portion 127, for example, may have an outer surface in surface-contact with an inner surface of the case body 120. More specifically, the cover 125 may airtightly block both ends of the case body 120, so as to hermetically seal the inner space of the case 110 from the outside.

The compressor 100*a* according to this implementation may be installed so that a lengthwise direction of the case 110 is in parallel with a horizontal direction.

With this configuration, the compressor 100*a* according to this implementation can significantly reduce the height of an installation space.

More specifically, for example, when the compressor 100*a* of this implementation is installed in a machine room of a refrigerator, the height of the machine room of the refrigerator can be significantly reduced. Accordingly, in the refrigerator provided with the compressor 100*a* according to this implementation, the height of the machine room can be reduced without increasing the height of a cabinet, thereby remarkably increasing the size of a food storage space defined inside the cabinet.

In this implementation, the horizontal direction may mean a right and left direction in the drawing (FIG. 1).

The right and left direction in the drawing (FIG. 1) may also be expressed as a front and rear direction.

The cover 125 which is coupled to one end portion (rear end portion) of the case body 120 may be referred to as a first cover or a rear cover, and the another cover 125 which is coupled to another end portion (front end portion) of the case body 120 may be referred to as a second cover or a front cover.

The case 110 may be provided with a suction pipe 130 through which gas to be compressed is sucked into the case 110.

The suction pipe 130 may be provided, for example, at one cover 125 (the first cover) located on one side (right side in the drawing) of the case 110.

The case 110 may be provided with a discharge pipe 135 through which compressed gas is discharged.

The discharge pipe 135 may be provided at the case body 120, for example.

In this implementation, the discharge pipe 135 may be provided on a lower portion of one side surface of the case body 120.

The case 110 may be provided with a process pipe 140 through which gas is supplemented into the case 110.

In this implementation, the process pipe 140 may be provided at one side (left side in the drawing) of the discharge pipe 135. The process pipe 140 may be coupled at a different height from the discharge pipe 135. In this implementation, the process pipe 140 may be coupled at a position higher than the discharge pipe 135.

The case 110 may be provided with a terminal 150 connected to an external power source. The terminal 150 may be connected to the driving unit 400. Accordingly, the driving unit 400 may be connected to the external power source to receive power from the external power source. The terminal 150 may be provided on one side surface of the case 110. In this implementation, the terminal 150 may be provided on an upper region of the discharge pipe 135.

The case 110 may be provided with legs 155 by which the case 110 is fastened to an object. The legs 155 may be provided on both sides of a lower portion of the case 110, respectively. The legs 155 may be spaced apart from each other in a lengthwise direction of the case 110.

More specifically, the pair of legs 155 may be provided respectively on lower portions of both end portions of the case 110 in the axial direction. Each of the legs 155 may be provided with a through hole 156 formed through a plate surface of the leg 155. Accordingly, a fixing member (not shown) coupled to the object may be coupled to the through hole 156. The fixing member, although not specifically shown in the drawings, may include, for example, a fixing bolt and an anti-vibration member.

The compression unit 200 may be provided inside the case 110.

The compression unit 200 may include, for example, a cylinder 210 and a piston 230 reciprocating within the cylinder 210.

The cylinder 210 may be formed, for example, in a cylindrical shape with both sides open.

The cylinder 210 may have a length longer than its diameter.

The cylinder 210 may be disposed inside the case 110 in the lengthwise direction of the case 110.

The piston 230 may be movable in the lengthwise direction of the case 110.

A frame 250 may be provided outside the cylinder 210.

The frame 250 may be provided with a body portion 252 having a cylindrical shape.

The cylinder 210 may be inserted into an inner surface of the frame 250.

The cylinder 210 may have an outer surface in surface-contact with the inner surface of the body portion 252 of the frame 250.

The cylinder 210 may be press-fitted into the body portion 252 of the frame 250.

The frame 250 may be provided with a flange portion 254 extending in a radial direction from one end (left end or front end in the drawing) in the axial direction.

In this implementation, the axial direction may refer to the same direction as a reciprocating direction of the piston 230.

An outer surface of the flange portion 254 of the frame 250 may be spaced apart from an inner surface of the case body 120 by a preset interval.

The driving unit 400 may be provided at one side (rear side) of the flange portion 254 of the frame 250.

The driving unit 400 may include, for example, a stator 410 and a mover 430 reciprocating with respect to the stator 410.

The stator 410 may include, for example, an outer stator 412 and an inner stator 414 that are concentrically coupled to each other, and a stator coil 416 wound inside the outer stator 412.

The stator coil 416 may receive power by being electrically connected to the terminal 150.

The stator coil 416 may include a bobbin 4161 disposed radially at an outer side of the inner stator 414 in a spaced manner, and a coil portion 4162 wound around the bobbin 4161. The coil portion 4162 may generate a magnetic flux when power is applied. Permanent magnets 432 to be explained later may reciprocate in the axial direction by interaction between the magnetic flux of the coil portion 4162 and a magnetic flux of the permanent magnets 432.

The bobbin 4161 and the inner stator 414 may be spaced apart from each other by a preset interval.

The mover 430 may be disposed between the bobbin 4161 and the inner stator 414 to reciprocate along the axial direction.

A stator cover 440 may be coupled to an end portion (rear end portion) of the stator 410.

The stator cover 440 may be formed in a disk shape and provided with a through portion 442 formed through its center.

The mover 430 may be inserted into the stator cover 440.

The mover 430 may have a cylindrical shape.

The mover 430 may have an inner diameter larger than that of the inner stator 414 and have an outer diameter smaller than an inner diameter of the bobbin 4161.

The mover 430, for example, may have permanent magnets 432.

A back cover 450 may be coupled to the stator cover 440.

A front end portion of the back cover 450 may be coupled to a rear end of the stator cover 440.

A resonance spring 460 that can be expanded and contracted in the axial direction may be provided between the stator cover 440 and the back cover 450.

The resonance spring 460, for example, may include a first resonance spring 4601 and a second resonance spring 4602 spaced apart from each other in the axial direction.

Each of the first resonance spring 4601 and the second resonance spring 4602 may be provided in plurality.

The first resonance springs 4601 may be spaced apart from one another in a circumferential direction.

The second resonance springs 4602 may be spaced apart from one another in a circumferential direction.

The first resonance springs 4601 and the second resonance springs 4602 may be disposed at the same positions along the circumferential direction or may be disposed in a zigzag form when viewed in the axial direction.

A rear region of the compression unit 200 may be supported by a rear elastic support portion 470.

The rear elastic support portion 470 may be coupled to the back cover 450.

The rear elastic support portion 470 may be provided with a spring 471.

The spring 471 may have a disk shape and may be provided with a coupling portion 472 formed on an outer edge to be coupled to the back cover 450. The coupling portion 472 may be provided in plurality formed on the outer edge to be spaced apart from one another along the circumferential direction. The spring 471 may include a plurality of elastically-deformable portions each protruding spirally from the outer edge toward the center.

A central region of the spring 471 may be coupled to a suction guide 475.

The suction guide 475 may be fixedly coupled to the case 110 (rear cover).

A flow path through which gas is sucked may be formed through an inside (center) of the suction guide 475 in the axial direction.

The flow path of the suction guide 475 may communicate with the suction pipe 130.

Gas introduced into the suction guide 475 through the suction pipe 130 may be accommodated in the accommodation space defined inside the case 110.

On the other hand, the piston 230 may be formed in a cylindrical shape.

A head 232 may be provided on one end portion of the piston 230.

The head 232 of the piston 230 may be formed on a front end portion of the piston 230.

The head 232 may be provided with a suction port 234 through which gas is sucked.

The suction port 234 may be formed through the head 232.

The suction port 234 may be provided in plurality.

The piston 230 (the head 232) may be provided with a suction valve 235 for opening and closing the suction ports 234.

The suction valve 235 may be configured such that one region is moved close to or away from the suction ports 234 in the axial direction.

More specifically, for example, the suction valve 235 may be configured such that its center is fixedly coupled to the piston 230 (head 232) by the fixing member 236 and a radially extending portion from the center is moved close to or away from the suction ports 234.

The piston 230 may be configured to reciprocate between a top dead center at which the piston 230 is inserted into the cylinder 210 by a maximum depth and a bottom dead center at which the piston 230 is spaced maximally apart from the top dead center toward one side (rear side) in the axial direction.

In this implementation, the top dead center may be formed close to one end (front end) of the cylinder 210. The bottom dead center may be formed to be spaced backward apart from the top dead center by a preset distance in the axial direction.

A compression space 220 in which gas is compressed may be defined inside one end portion (front end portion) of the cylinder 210.

A discharge valve 215 for opening and closing an opening of the front end portion of the cylinder 210 may be provided on the front end portion of the cylinder 210. Here, the opening of the front end portion of the cylinder 210 may be defined as a discharge port 212 in that compressed gas in the compression space 220 is discharged through the opening.

The compression space 220 may be defined between the discharge valve 215 and the suction valve 235 in the axial direction.

The discharge valve 215 may include, for example, a valve 217 for blocking the opening (discharge port 212) of the end portion of the cylinder 210, and a discharge valve spring 218 for elastically supporting the valve 217 in the axial direction.

The valve 217 may be implemented, for example, in a disk shape.

The valve 217 may have an outer diameter corresponding to an inner diameter of the cylinder 210.

This implementation illustrates the case where the valve 217 has the outer diameter larger than the inner diameter of the cylinder 210 so as to be in contact with (blocked by) the end portion of the cylinder, but is merely illustrative. The valve 217 may alternatively have the outer diameter smaller than the inner diameter of the cylinder 210 so as to be inserted into (blocked by) the cylinder 210.

The valve 217 may be spaced forward apart from the front end portion of the cylinder 210 in the axial direction to open the opening (the discharge port 212) of the front end portion of the cylinder 210.

Here, the discharge valve spring 218 may open the end portion of the cylinder 210 when internal pressure of the compression space 220 reaches or exceeds a preset pressure.

Specifically, the discharge valve spring 218 may have a preset elastic force, and the preset elastic force may be set to a value smaller than a preset pressure inside the compression space 220.

Accordingly, when internal pressure (internal gas pressure) of the compression space 220 is compressed by the reciprocating motion of the piston 230 so as to reach a preset pressure, the discharge valve spring 218 may be elastically deformed in the axial direction. The discharge valve 215 may be spaced forward apart from the front end portion of the cylinder 210 in the axial direction to open the opening (the discharge port 212) of the front end portion of the cylinder 210.

The suction valve 235 may open the suction ports 234 when the compression space 220 is expanded.

The suction valve 235 may block the suction ports 234 when the compression space 220 is contracted.

The suction valve 235 may open the suction ports 234 when the piston 230 moves from the top dead center to the bottom dead center.

The suction valve 235 may block the suction ports 234 when the piston 230 moves from the bottom dead center to the top dead center.

The discharge valve 215 may block the end portion (discharge port 212) of the cylinder 210 when the compression space 220 is expanded.

The discharge valve 215 may block the end portion of the cylinder 210 when the compression space 220 is contracted.

Meanwhile, a suction muffler 260 may be provided on another end portion (rear end portion) of the piston 230.

The suction muffler 260, for example, may be formed substantially in a cylindrical shape.

One end portion (front end portion) of the suction muffler 260 may be integrally coupled to the rear end portion of the piston 230. Accordingly, the suction muffler 260 may reciprocate in association with the piston 230.

A suction portion 262 communicating with the inner accommodation space of the case 110 may be provided on a rear end portion of the suction muffler 260.

The suction portion 262 may divide an inner space of the suction muffler 260 into a to plurality of spaces in the axial direction.

The suction muffler 260 may be provided therein with guides 264 for communicating the axially divided spaces with one another. Each of the guides 264 may have a preset length in the axial direction.

Gas sucked into the suction muffler 260 may be compressed at a position where a flow cross-sectional area is contracted and expanded at a position where the flow cross-sectional area is expanded along a flowing direction. While the contraction and the expansion are repeated, the gas may be sucked into the inner space of the piston 230.

Meanwhile, a discharge space 282 through which compressed gas is discharged may be formed in an opposite side to the compression space 220 with the discharge valve 215 interposed therebetween in the axial direction.

The discharge valve 215 may be located at the front of the compression space 220 and the discharge space 282 may be located at the front of the discharge valve 215.

A discharge cover 280 defining the discharge space 282 therein may be provided on the front of the cylinder 210.

The discharge cover 280 may be coupled to the front end portion of the cylinder 210 and the front end portion of the frame 250.

The discharge space 282 may include, for example, a first discharge space 2821, a second discharge space 2822, and a third discharge space 2823 partitioned by a plurality of partition walls.

Although not specifically illustrated in the drawings, communication holes may be formed through the plurality of partition walls, respectively.

The first discharge space 2821, the second discharge space 2822, and the third discharge space 2823 may communicate with one another by the plurality of communication holes formed through the plurality of partition walls, respectively.

The first discharge space 2821 may communicate with the compression space 220 when the discharge valve 215 is opened.

A loop pipe 285 having one end portion communicating with the discharge pipe 135 may be connected to communicate with one side of the third discharge space 2823.

Meanwhile, the discharge gas may partially be introduced into a gap between the cylinder 210 and the piston 230 so as to define a gas bearing.

The compressed gas introduced into the gap between the cylinder 210 and the piston 230 may push the outer surface of the piston 230 to be spaced apart from the inner surface of the cylinder 210, thereby reducing friction occurred between the cylinder 210 and the piston 230.

A gas groove 292 into which gas is to be introduced may be formed in a contact region between the body portion 252 of the frame 250 and the cylinder 210.

The gas groove 292 may be formed, for example, in an annular shape in the inner surface of the body portion 252 and/or the outer surface of the cylinder 210.

A nozzle 294 for spraying gas into the cylinder 210 may be provided in the cylinder 210.

The nozzle 294 may be formed through the cylinder 210 to communicate with the gas groove 292.

The flange portion 254 of the frame 250 may be provided with a first bearing communication hole 290 communicating with the gas groove 292.

The first bearing communication hole 290 may be formed, for example, to be tilted with respect to the axial direction.

The first bearing communication hole 290 may be formed to communicate with a second bearing communication hole 287 formed in the discharge cover 280.

The second bearing communication hole 287 may be formed to communicate with the discharge space 282 (the third discharge space 2823) of the discharge cover 280.

Accordingly, the compressed gas which is compressed in the compression space 220 and is discharged to the discharge space 282 may partially be supplied between the cylinder 210 and the piston 230 so as to serve as a gas bearing for reducing friction between the cylinder 210 and the piston 230.

On the other hand, the discharge cover 280 may be provided with a protrusion 2825 protruding in the axial direction.

The protrusion 2825 may protrude from a center of a front end portion of the discharge cover 280.

The protrusion 2825 may have an outer diameter reduced relative to an outer diameter of the discharge cover 280.

Figure 3:
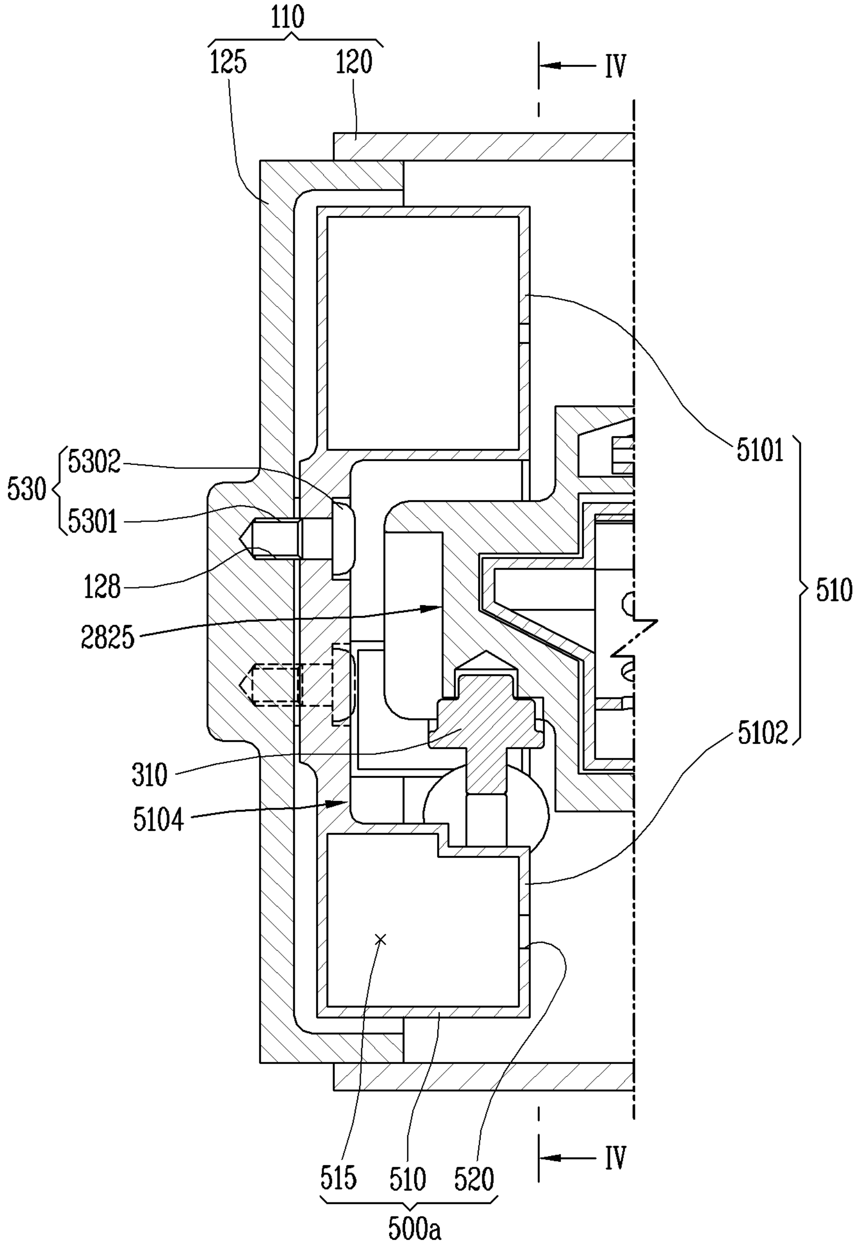
FIG. 3 is an enlarged view of a resonator region of FIG. 2.
Figure 4:
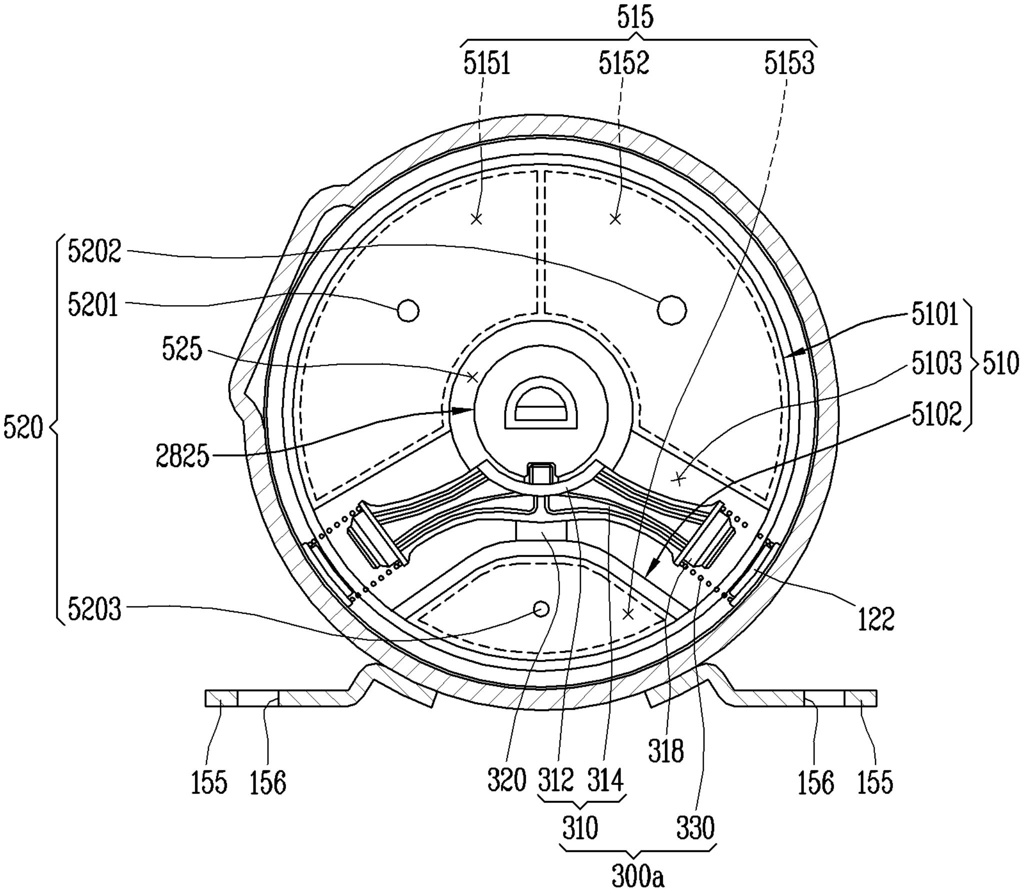
FIG. 4 is a sectional view of a supporter region of FIG. 3.

FIG. 3 is an enlarged view illustrating a resonator region of FIG. 2, and FIG. 4 is a cross-sectional view illustrating a support region of FIG. 3. As illustrated in FIGS. 3 and 4, the discharge cover 280 may be provided with a front elastic support portion 300*a*.

The front elastic support portion 300*a* may include, for example, a supporter 310 coupled to the discharge cover 280 and a buffer support member inserted between the supporter 310 and the case 110.

The buffer support member, for example, may be implemented as a compression coil spring that can be expanded and contracted in a lengthwise direction.

This implementation exemplarily illustrates the case where the buffer support member is implemented as the compression coil spring. However, this is merely illustrative and the present disclosure may not be limited thereto. The buffer support member may alternatively be implemented as a leaf spring.

The supporter 310 may include a contact part 312 brought into contact with the discharge cover 280, and rod parts 314 each protruding from the contact part 312 toward the inner surface of the case 110.

The contact part 312, for example, may be disposed horizontally on a lower portion of the discharge cover 280 along a direction perpendicular to the lengthwise direction (axial direction) of the case 110.

The rod parts 314 may extend downward from both ends of the contact part 312 toward the inner surface of the case body 120, respectively.

The contact part 312 may be fixedly coupled to the lower portion of the discharge cover 280 by a fixing member. Here, the fixing member, for example, may be implemented as a screw or bolt having a male screw.

The contact part 312 may have a contact surface to come in surface-contact with a lower surface of the discharge cover 280.

A fixing member insertion portion (not shown) may be formed through the contact part 312 so that the fixing member can be inserted.

A spring coupling portion to which one end portion of the buffer support member is coupled may be provided on an end portion of each rod part 314. The spring coupling portion may be inserted into the buffer support member. This may prevent the buffer support member from being suddenly separated from the rod part 314.

One end portion of the buffer support member may be fixedly coupled to the end portion of the rod part 314, and another end portion of the buffer support member may be fixedly coupled to the case 110. The case 110 may be provided with a spring support portion 122 for supporting the another end portion of the buffer support member.

Accordingly, the front end portion (discharge cover 280) of the compression unit 200 can be elastically supported by the front elastic support portion 300*a*.

In this implementation, the compression unit 200 can be buffered and supported by the front elastic support portion 300*a* and the rear elastic support portion 470 during operation, which may result in preventing vibration occurred during the operation from being transferred to the case 110.

On the other hand, a resonator 500*a* may be provided in the case 110.

The resonator 500*a* may include, for example, a body 510 forming a cavity 515 therein, and a hole 520 formed through the body 510 to communicate with the cavity 515.

The resonator 500*a* may be disposed at a position spaced apart from the compression unit 200 in the axial direction.

In detail, the compression unit 500*a* may be provided on an inner wall of an end portion of the case 110.

The resonator 500*a* may be disposed so that the hole 520 faces the compression unit 200.

More specifically, in the compressor having the same structure as that illustrated in this implementation, the piston 230, the suction valve 235, the suction muffler 260, and the discharge valve 215 may all move in the axial direction, which may cause various types of noise along the axial direction. In particular, compressed gas may be periodically discharged from the compression space 220 to the discharge space 282 when the discharge valve 215 is opened. At this time, noise of a specific low frequency may be generated. The noise of the specific low frequency may collide with an inner wall of a cover in the front end portion of the case 110 and be reflected and resonated. Such noise may then be amplified and increased thereby.

In the compressor 100*a* according to this implementation, noise which is generated when the compression unit 200 is operated and transferred to the front end portion in the axial direction cannot be reflected by being absorbed by the resonator 500*a*. This may result in preventing an increase in noise in the case 110 due to reflection and resonance.

The resonator 500*a* may be formed of a synthetic resin member or steel.

The resonator 500*a* may be formed of a stainless member.

Accordingly, the compressor 100*a* according to the implementation can prevent an occurrence of deterioration of noise reduction performance due to oil contact, unlike the related art compressor with a soundproof structure having a fiber member in which the noise reduction performance is deteriorated due to contamination of the fiber member by oil.

The resonator 500*a* may be coupled to the inner wall of one end portion (front end portion) of the case 110 by a fixing member. The fixing member may be implemented as a screw or bolt having a male screw.

Accordingly, a welding operation can be excluded upon installing the resonator 500*a*, thereby suppressing bad effects caused due to the welding. More specifically, for example, deformation of peripheral parts caused due to high heat generated during welding can be suppressed.

The case 110 (the second cover) may be provided with a female screw to which the fixing member can be screwed.

Figure 5:
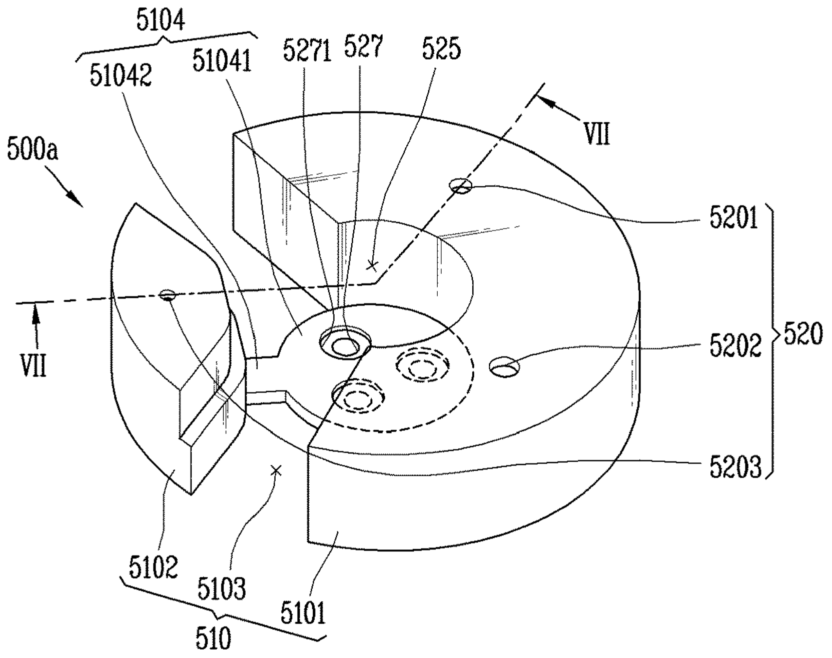
FIG. 5 is a perspective view of a resonator of FIG. 3.
Figure 6:
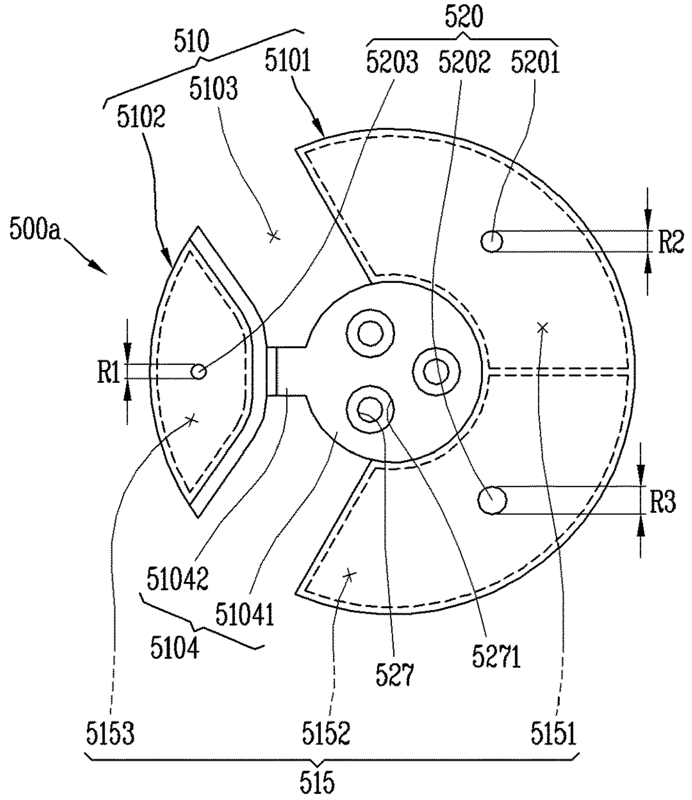
FIG. 6 is a planar view of the resonator of FIG. 5.
Figure 7:
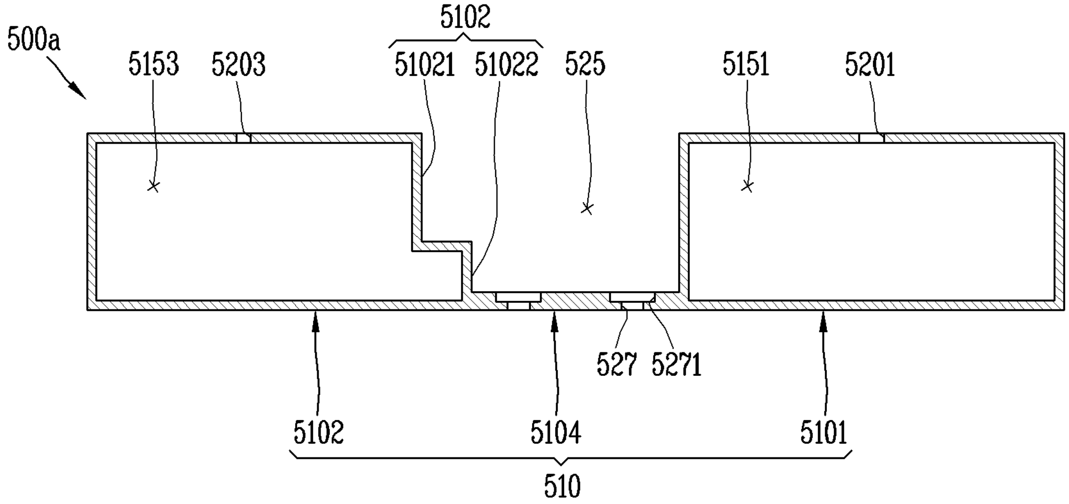
FIG. 7 is a sectional view of the resonator of FIG. 5.

FIG. 5 is a perspective view of the resonator of FIG. 3, FIG. 6 is a planar view of the resonator of FIG. 5, and FIG. 7 is a cross-sectional view of the resonator of FIG. 5. As illustrated in FIGS. 5 to 7, the resonator 500*a* may be formed substantially in a disk shape.

The resonator 500*a* may be provided with a recess portion 525 recessed in the axial direction to accommodate an end portion of the discharge cover 280.

Accordingly, in the compressor 100*a* according to the implementation, the resonator 500*a* and the discharge cover 280 may be arranged to overlap each other in the axial direction, which may result in preventing an increase in an axial length of the compressor 100*a* due to the installation of the resonator 500*a*.

The recess portion 525 maybe recessed into a center of the resonator 500*a* in the axial direction.

An inner surface of the recess portion 525 may be spaced apart from an outer surface of the protrusion 2825 of the discharge cover 280 by a preset interval.

Accordingly, unnecessary contact between the resonator 500*a* and the discharge cover 280 can be suppressed when the discharge cover 280 is vibrated due to vibration generated when the compression unit 200 is operated.

The resonator 500*a* may be provided with a supporter accommodating portion 5103 in which the supporter 310 of the discharge cover 280 can be accommodated.

The supporter accommodating portion 5103 may be formed in a shape downwardly inclined from the center of the resonator 500*a* to the outside to correspond to the shape of the supporter 310.

The body 510 of the resonator 500*a* may include an upper body 5101 disposed above the supporter accommodating portion 5103 and a lower body 5102 disposed below the supporter accommodating portion 5103.

An inner surface of the upper body 5101 may be formed to have the same inner diameter along the axial direction.

The lower body 5102 may have an inner surface of a stepped cross-sectional shape in which a region where the supporter 310 is located has a larger inner diameter.

More specifically, for example, the inner surface of the lower body 5102 may have a first inner surface having a relatively large inner diameter and a second inner surface having an inner diameter reduced compared to the first inner surface.

The body 510 of the resonator 500*a* may include a connecting portion 5104 for connecting the upper body 5101 and the lower body 5102.

The connecting portion 5104 may include a disk portion 51041 having a substantially disk shape and a protrusion 51042 protruding from the disk portion 51041.

The resonator 500*a* may include a fixing member coupling portion 527 to which a fixing member 530 is coupled.

The fixing member coupling portion 527 may be formed in the connecting portion 5104.

The fixing member coupling portion 527 may be formed through a plate surface of the connecting portion 5104.

The fixing member coupling portion 527 may be provided in plurality.

The implementation according to the present disclosure provides three fixing member coupling portions 527.

The fixing member coupling portions 527, for example, may be formed at positions corresponding to vertices of a substantially triangular shape, respectively.

Each of the fixing member coupling portions 527 may include, for example, a head accommodating portion 5271 that is extended to accommodate a head 5302 of the fixing member 530.

Meanwhile, the cavity 515 may include a first cavity 5151 and a second cavity 5152 formed in the upper body 5101 to be partitioned from each other, and a third cavity 5153 formed in the lower body 5102.

The hole 520 may include a first hole 5201 formed through the upper body 5101 to communicate with the first cavity 5151, a second hole 5202 formed through the upper body 5101 to communicate with the second cavity 5152, and a third hole 5203 formed through the lower body 5102 to communicate with the third cavity 5153.

In this implementation, the first hole 5201, the second hole 5202, and the third hole 5203 may be implemented in different sizes.

This structure may result in reducing noises of three different frequencies (frequency bands) among various noises inside the case 110.

More specifically, for example, the third hole 5203 among the three holes 520 may have a first diameter R1 which is the smallest, the first hole 5201 may have a second diameter R2 larger than the first diameter R1, and the second hole 5202 may have a third diameter R3 larger than the second diameter R2.

Noises generated inside the case 110 when the compressor 100*a* according to the implementation having the structure is operated may have higher noise intensities, for example, in the order of frequency bands of 250 Hz, 315 Hz, 200 Hz, 400 Hz, . . . , according to a one-third (⅓) octave band frequency analysis.

In this implementation, the resonator 500*a* may be provided with the three cavities 515 and the three holes 520, and attenuate noises of three different frequencies (e.g., 200 Hz, 250 Hz, and 315 Hz each having high noise intensity).

In more detailed example, the third cavity 5153 and the third hole 5203 may reduce noise at a frequency of 200 Hz.

The first cavity 5151 and the first hole 5201 may reduce noise at a frequency of 250 Hz.

The second cavity 5152 and the second hole 5202 may reduce noise at a frequency of 315 Hz.

In this implementation, the frequencies of 200 Hz, 250 Hz, and 315 Hz may be frequencies of the frequency band by the one-third octave band frequency analysis, and may correspond to frequency bands of 178-224 Hz, 224-282 Hz, and 282-355 Hz of a 1/1 octave band. The frequency 400 Hz may correspond to a frequency band of 355-447 Hz of the 1/1 octave band.

With this configuration, when power is applied to the driving unit 400, a magnetic field may be formed in the stator coil 416 and interact with a magnetic field produced by the permanent magnets 432, so that the mover 430 can reciprocate along the axial direction.

As the mover 430 reciprocates along the axial direction, the piston 230 may reciprocate between a top dead center and a bottom dead center.

When the piston 230 moves from the top dead center to the bottom dead center, the compression space 220 may be expanded and internal pressure may be reduced. When the piston 230 moves to the bottom dead center, the suction valve 235 may open the suction ports 234, such that gas inside the piston 230 can be sucked into the compression space 220 through the suction ports 234.

When the piston 230 moves from the bottom dead center to the top dead center, the suction valve 235 may close the suction ports 234. Responsive to this, the compression space 220 may be contracted and the gas in the compression space 220 may be compressed.

When the gas inside the compression space 220 is compressed and the internal pressure rises to reach a preset pressure, the discharge valve 215 may be spaced apart from the discharge port 212 of the cylinder 210 in the axial direction, so as to open the discharge port 212 (front end portion) of the cylinder 210.

The gas compressed in the compression space 220 may be introduced into the discharge space 282 and flow along the first discharge space 2821, the second discharge space 2822, and the third discharge space 2823 inside the discharge cover 280.

In the compressor 100*a* according to this implementation, the process in which the discharge valve 215 is opened and the compressed gas is discharged may be repeated in a short cycle, thereby generating pulsation.

In detail, the compressed gas passing through the discharge port 212 may be expanded while moving from the compression space 220 to the first discharge space 2821, be contracted while passing through a partition wall (communication hole) dividing the first discharge space 2821 and the second discharge space 2822 from each other, and be then expanded again in the second discharge space 2822. The gas in the second discharge space 2822 may be contracted while passing through a partition wall (communication hole) dividing the second discharge space 2822 and the third discharge space 2823 from each other, and be then expanded in the third discharge space 2823. Through the process, the pulsation can be reduced.

A part of the gas passing through the third discharge space 2823 may flow into the gas groove 292 via the first bearing communication hole 290 and the second bearing communication hole 287, so as to be supplied between the inner surface of the cylinder 210 and the outer surface of the piston 230 through the nozzle 294.

Accordingly, friction between the cylinder 210 and the piston 230 can be reduced.

Another part of the gas passing through the third discharge space 2823 may flow into the discharge pipe 135 via the loop pipe 285 and flow out of the case body 120. The gas may then circulate along a refrigerating cycle so as to be introduced into the case 110 through the suction pipe 130.

On the other hand, noises of various frequencies may be generated in the case 110 during the suction, compression, and discharge of the gas. The noises generated during the operation of the compression unit 200 and the driving unit 400 may move to the inner front region of the case 110 along the axial direction. At this time, the resonator 500*a* may absorb and attenuate noise of a frequency having the highest intensity among those noises, thereby remarkably reducing the noises inside the case 110.

More specifically, the noises at the frequencies of 250 Hz, 315 Hz, and 200 Hz, which have the highest noise intensity (db) among the noises generated inside the case 110 during the operation of the compression unit 200 and the driving unit 400, may be removed by being absorbed in the first cavity 5151, the second cavity 5152, and the third cavity 5153 through the first hole 5201, the second hole 5202, and the third hole 5203, respectively. This may result in significantly reducing overall noise intensity inside the case 110.

Figure 8:
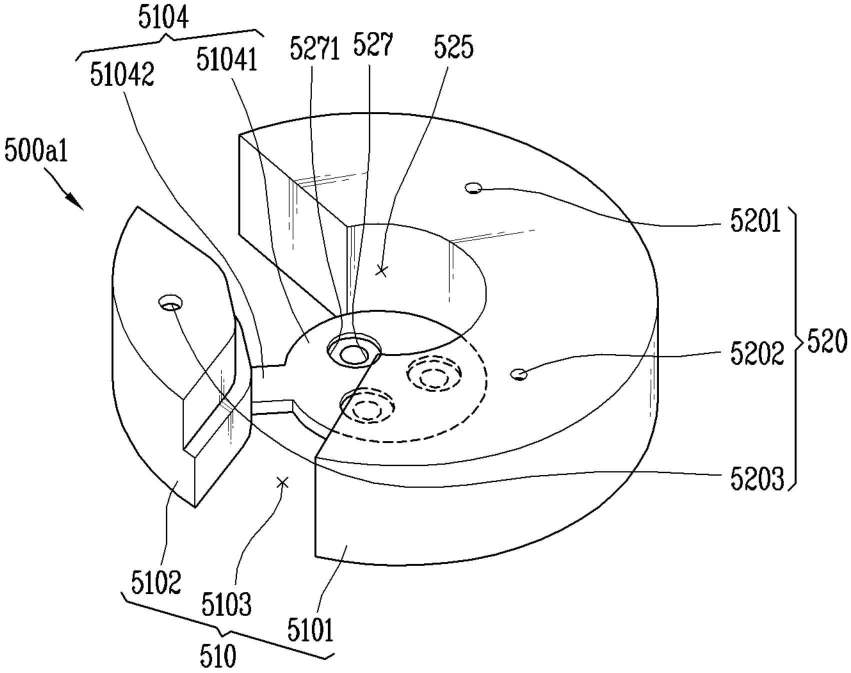
FIG. 8 is an exemplary view illustrating a variation of the resonator of FIG. 2.
Figure 9:
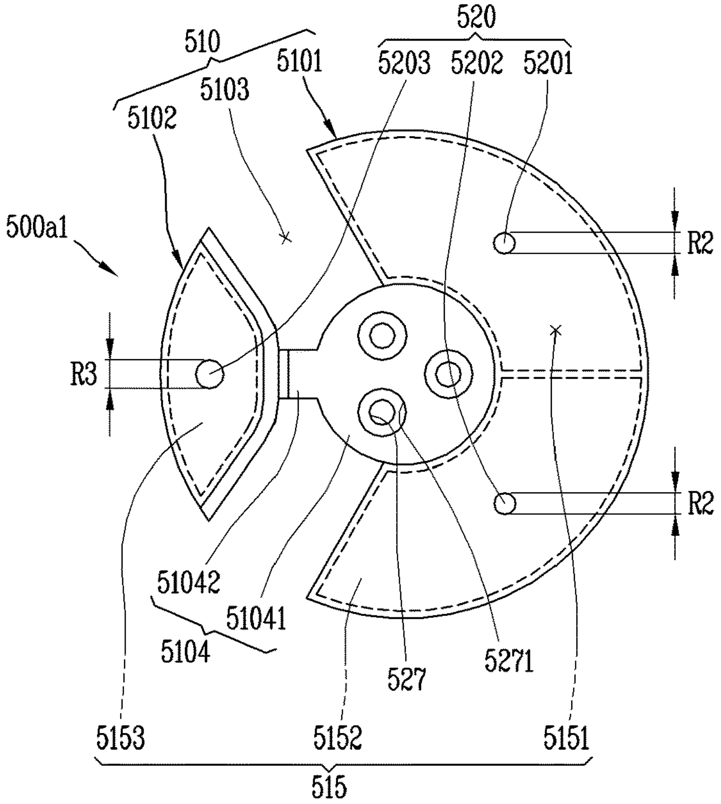
FIG. 9 is a planar view of the resonator of FIG. 8.

FIG. 8 is an exemplary view illustrating a variation of the resonator of FIG. 2, and FIG. 9 is a planar view of the resonator of FIG. 8. As illustrated in FIGS. 8 and 9, a resonator **500*a*1 may include a body 510 having a cavity 515 formed therein, and a hole 520 formed through the body 510 to communicate with the cavity 515**.

The resonator **500*a*1** may be implemented in a substantially disk shape.

The resonator **500*a*1 may be provided with a recess portion 525 recessed in its center in the axial direction to accommodate an end portion of the discharge cover 280**.

The resonator **500*a*1 may be provided with a supporter accommodating portion 5103 in which the supporter 310 coupled to the discharge cover 280** can be accommodated.

The body 510 may include an upper body 5101 disposed above the supporter accommodating portion 5103 and a lower body 5102 disposed below the supporter accommodating portion 5103.

The cavity 515 may include a first cavity 5151 and a second cavity 5152 formed in the upper body 5101 to be partitioned from each other, and a third cavity 5153 formed in the lower body 5102.

The hole 520 may include a first hole 5201 communicating with the first cavity 5151, a second hole 5202 communicating with the second cavity 5152, and a third hole 5203 communicating with the third cavity 5153.

The first cavity 5151 and the second cavity 5152 may be formed symmetrically with each other.

The first cavity 5151 and the second cavity 5152 may be formed to have the same volume.

The first hole 5201 and the second hole 5202 may have the same size and may be formed symmetrically with each other.

This structure may increase a sound absorption coefficient of noises at the same frequency, thereby remarkably reducing the noises of the frequencies.

In this implementation, the first cavity 5151 and the first hole 5201, and the second cavity 5152 and the second hole 5202 may be configured to attenuate, for example, noises at a frequency of 250 Hz. The first hole 5201 and the second hole 5202 may have a second diameter R2.

Accordingly, the noise at the frequency of 250 Hz having the highest noise intensity (db) among the noises generated in the compressor **100*a*** can be significantly reduced.

The third cavity 5153 may be configured to attenuate, for example, noise at a frequency of 315 Hz.

The third hole 5203 communicating with the third cavity 5153 may have a larger size than the first hole 5201 and the second hole 5202. The third hole 5203 may have a third diameter R3 larger than the second diameter R2.

Accordingly, the noise at the frequency of 315 Hz having the second highest noise intensity among the noises generated in the compressor **100*a*** can be reduced.

Figure 10:
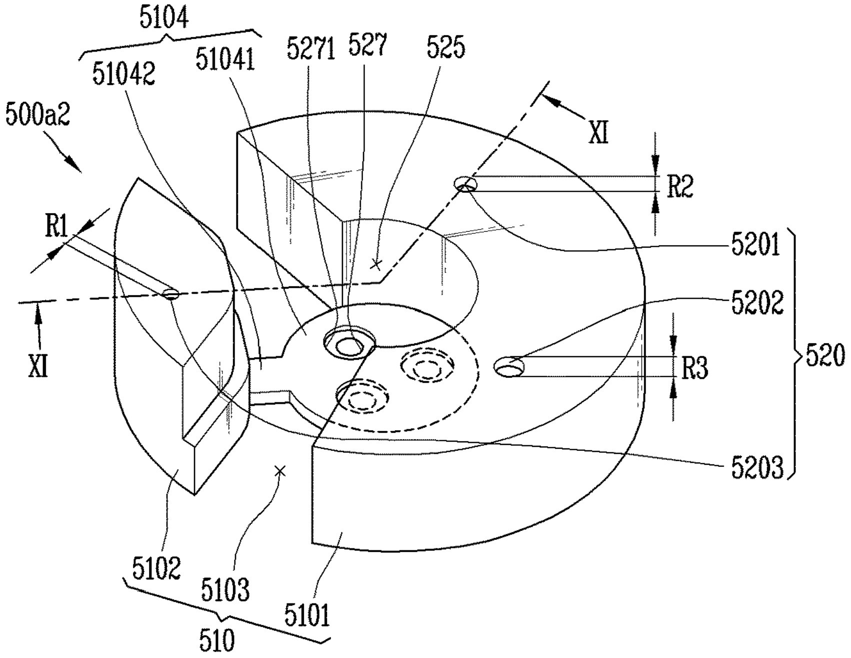
FIG. 10 is an exemplary view illustrating a variation of the resonator of FIG. 2.
Figure 11:
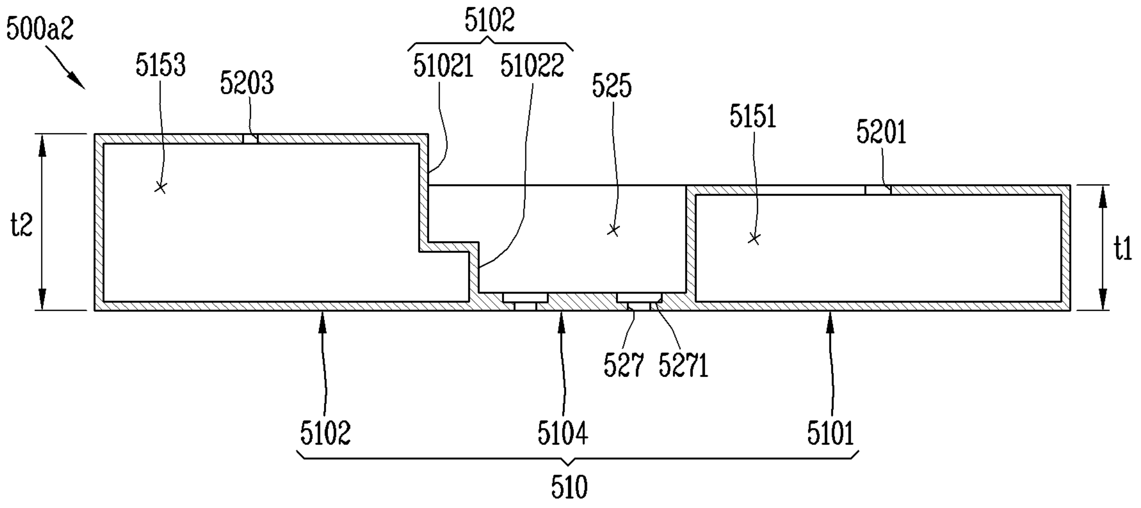
FIG. 11 is a planar view of the resonator of FIG. 10.

FIG. 10 is an exemplary view illustration a variation of the resonator of FIG. 2, and FIG. 11 is a planar view of the resonator of FIG. 10. As illustrated in FIGS. 10 and 11, a resonator **500*a*2 may include a body 510 having a cavity 515 formed therein, and a hole 520 formed through the body 510 to communicate with the cavity 515**.

The resonator **500*a*2** may be implemented in a substantially disk shape.

The resonator **500*a*2 may be provided with a recess portion 525 recessed in its center in the axial direction to accommodate an end portion of the discharge cover 280**.

The resonator **500*a*2 may be provided with a supporter accommodating portion 5103 in which the supporter 310 coupled to the discharge cover 280** can be accommodated.

The body 510 may include an upper body 5101 disposed above the supporter accommodating portion 5103 and a lower body 5102 disposed below the supporter accommodating portion 5103.

The cavity 515 may include a first cavity 5151 and a second cavity 5152 formed in the upper body 5101 to be partitioned from each other, and a third cavity 5153 formed in the lower body 5102.

The hole 520 may include a first hole 5201 communicating with the first cavity 5151, a second hole 5202 communicating with the second cavity 5152, and a third hole 5203 communicating with the third cavity 5153.

In this implementation, the first hole 5201, the second hole 5202, and the third hole 5203 may be implemented in different sizes.

The third hole 5203 may have the smallest size (first diameter R1), the first hole 5201 may have a larger size (second diameter R2) than the third hole 5203, and the second hole 5202 may have a larger size (third diameter R3) than the first hole 5201.

The first cavity 5151 and the second cavity 5152 may be formed to have the almost same volume.

Meanwhile, the third cavity 5153 having the third hole 5203 with the smallest diameter R1 may more protrude toward the compression unit 200 in the axial direction than the first cavity 5151 and the second cavity 5152.

As a result, the volume of the third cavity 5153 may be increased, so that noise attenuation characteristics of a relatively low frequency can be improved.

A thickness t2 of the third cavity 5153 may be set to be thicker than a thickness t2 of the first cavity 5151 and the second cavity 5152.

More specifically, the first cavity 5151 and the first hole 5201 may be configured to attenuate, for example, noise of a frequency of 250 Hz.

The second cavity 5152 and the second hole 5202 may be configured to attenuate, for example, noise of a frequency of 315 Hz.

The third cavity 5153 and the third hole 5203 may be configured to attenuate, for example, noise of a frequency of 200 Hz.

In this implementation, the third cavity 5153 may protrude more in the axial direction to increase a volume. Therefore, the noise of the frequency of 200 Hz, which is the lowest frequency among the frequencies to be attenuated, can be further reduced.

Figure 12:
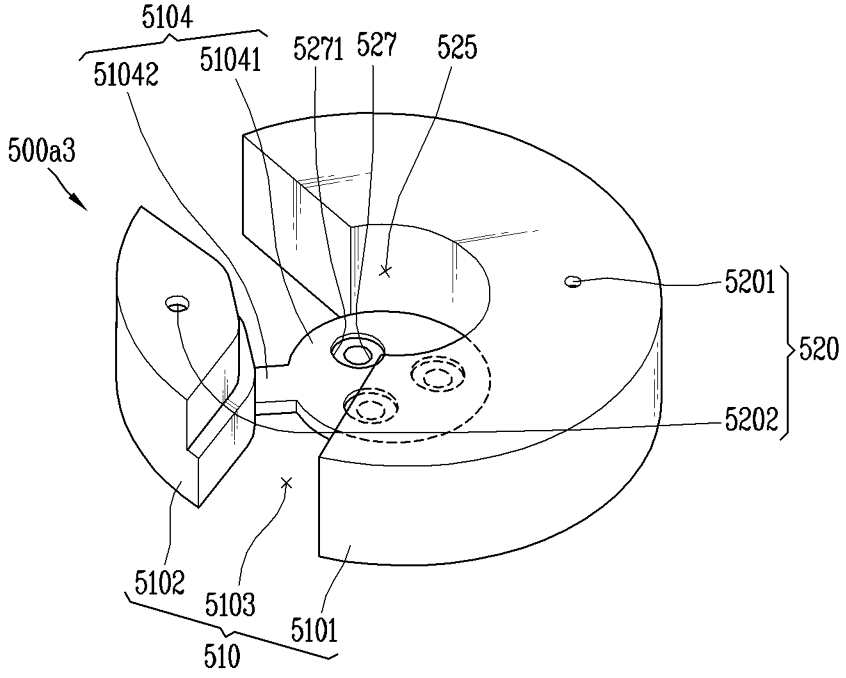
FIG. 12 is a perspective view of a resonator of FIG. 3.
Figure 13:
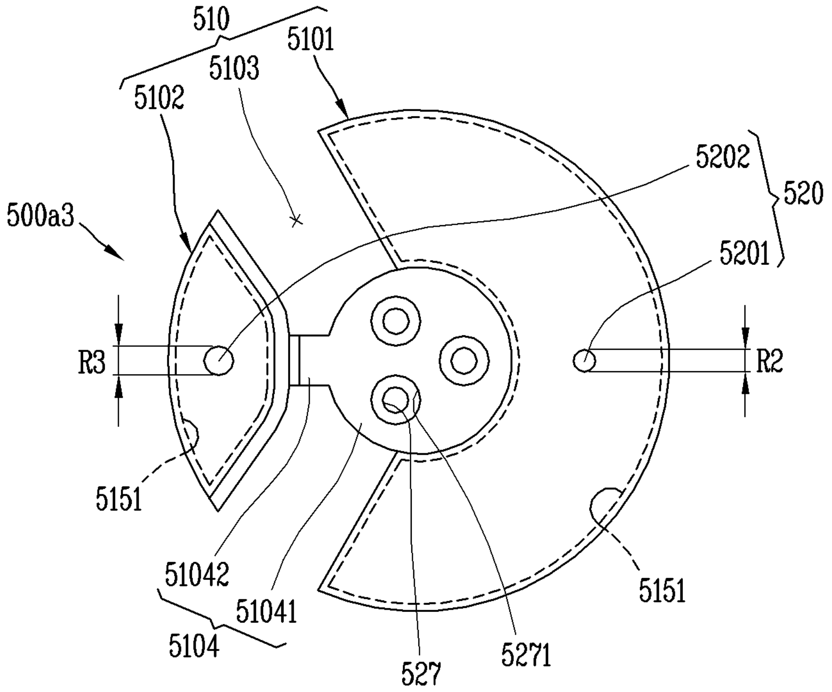
FIG. 13 is a planar view of the resonator of FIG. 12.

FIG. 12 is a perspective view illustrating the resonator of FIG. 3, and FIG. 13 is a planar view of the resonator of FIG. 12. As illustrated in FIGS. 12 and 13, a resonator **500*a*3 may include a body 510 having a cavity 515 formed therein, and a hole 520 formed through the body 510 to communicate with the cavity 515**.

The resonator **500*a*3** may be implemented in a substantially disk shape.

The resonator **500*a*3 may be provided with a recess portion 525 recessed in its center in the axial direction to accommodate an end portion of the discharge cover 280**.

The resonator **500*a*3 may be provided with a supporter accommodating portion 5103 in which the supporter 310 coupled to the discharge cover 280** can be accommodated.

The body 510 may include an upper body 5101 disposed above the supporter accommodating portion 5103 and a lower body 5102 disposed below the supporter accommodating portion 5103.

In this implementation, the cavity 515 of the resonator **500*a*3 may include a first cavity formed in the upper body 5101, and a second cavity 5152 formed in the lower body 5102**.

The hole 520 may include a first hole 5201 communicating with the first cavity 5151, and a second hole 5202 communicating with the second cavity 5152.

In this implementation, the first hole 5201 and the second hole 5202 may be implemented in different sizes.

This implementation exemplarily illustrates the case where the first hole 5201 and the second hole 5202 have different sizes, but this is merely illustrative. The present disclosure may not be limited to this.

The first hole 5201 and the second hole 5202 may alternatively be formed to have the same size.

In this implementation, the first hole 5201 may have a smaller size than the second hole 5202.

Accordingly, noises of relatively low frequencies can be attenuated by the first cavity 5151 having a relatively small volume, which may allow the noises of the relatively low frequencies to be significantly reduced.

More specifically, in this implementation, the first cavity 5151 and the first hole 5201 may be configured to attenuate, for example, noise of a frequency of 250 Hz, which is a relatively low frequency.

The first hole 5201 may have, for example, a second diameter R2.

The second cavity 5152 and the second hole 5202 may be configured to attenuate, for example, noise of a frequency of 315 Hz, which is a relatively high frequency.

The second hole 5202 may have, for example, a third diameter R3.

With this configuration, since the volume of the first cavity 5151 is larger than the volume of the second cavity 5202, the noise of the frequency of 250 Hz, which is the relatively low frequency, can be significantly reduced.

Figure 14:
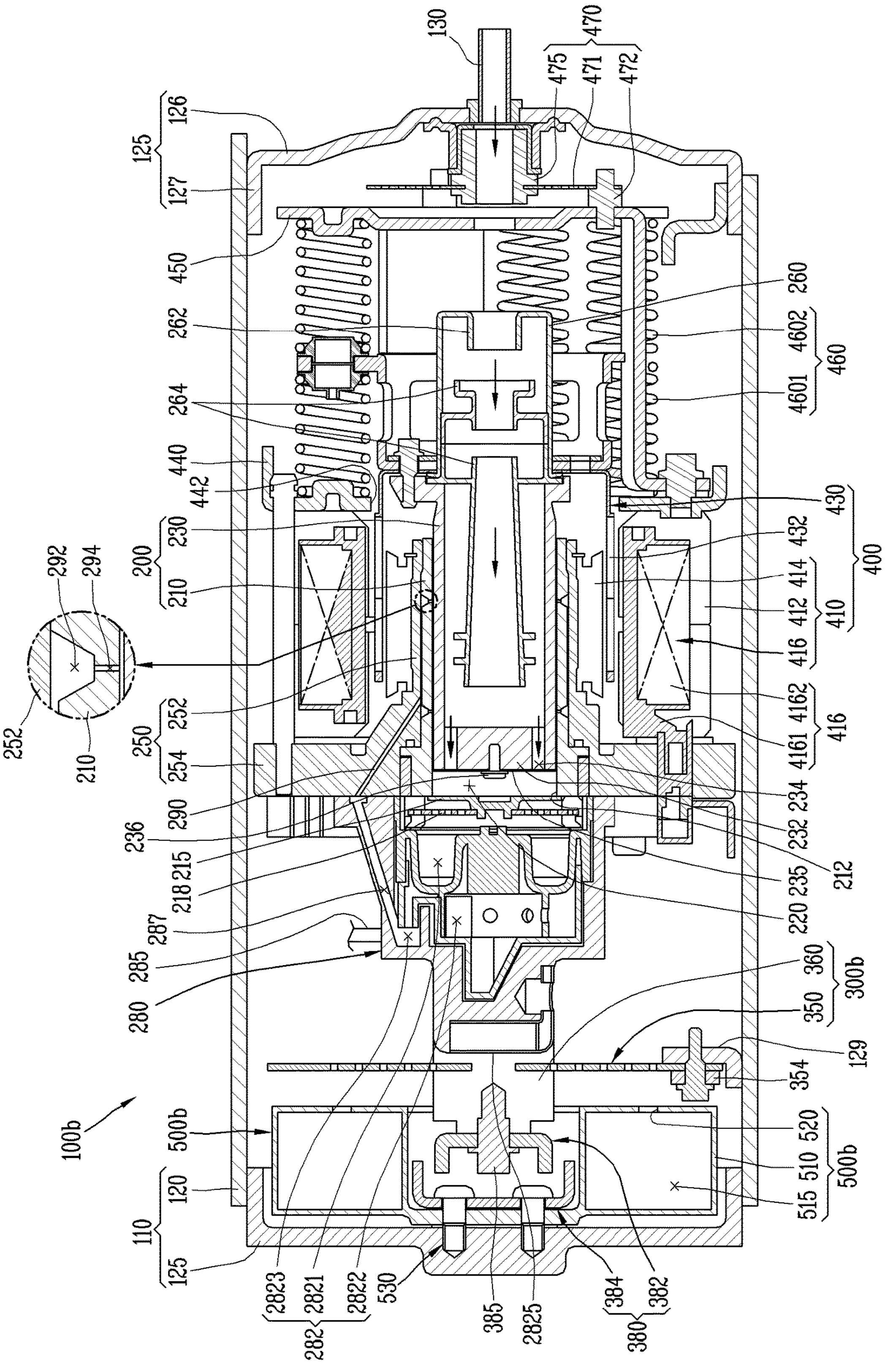
FIG. 14 is a sectional view of a compressor in accordance with another implementation of the present disclosure.
Figure 15:
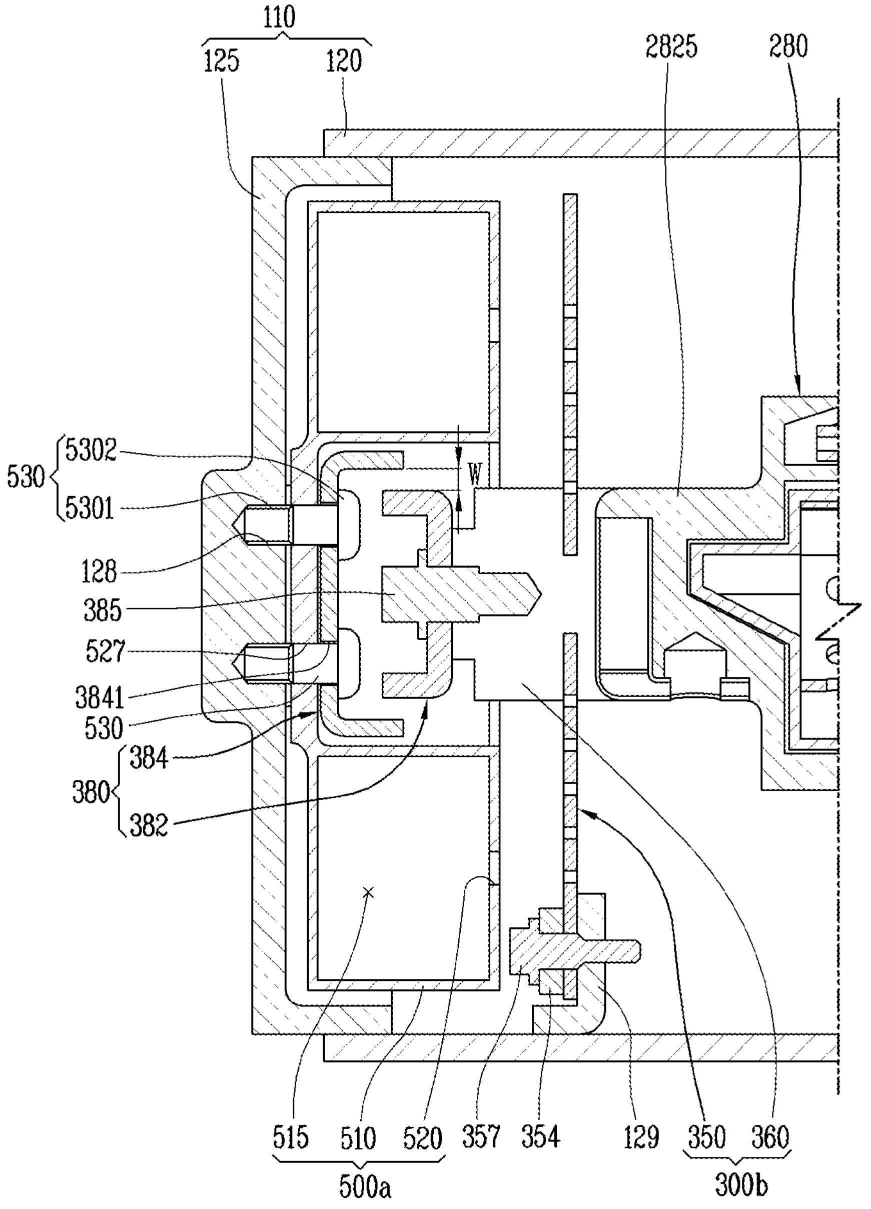
FIG. 15 is an enlarged view of a main part of FIG. 14.
Figure 16:
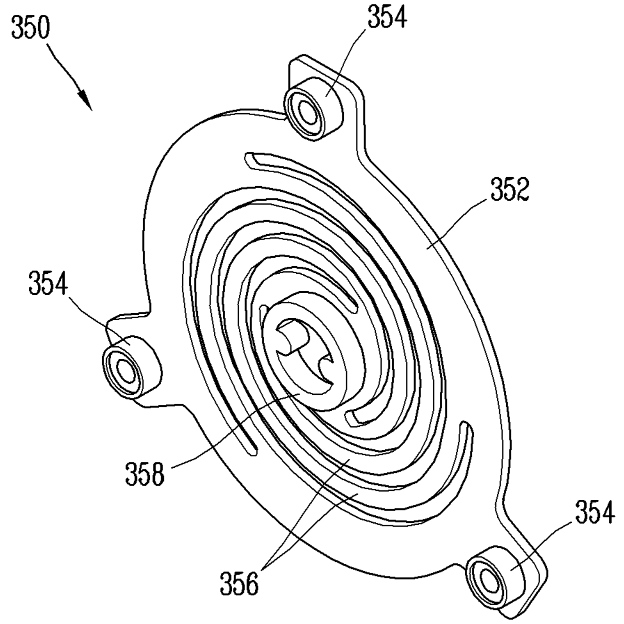
FIG. 16 is a perspective view of a spring of FIG. 15.

FIG. 14 is a sectional view of a compressor in accordance with another implementation of the present disclosure, FIG. 15 is an enlarged view of a main part of FIG. 14, and FIG. 16 is a perspective view of a spring of FIG. 15. As illustrated in FIGS. 14 and 15, a compressor **100*b* according to this implementation may include a case 110, a compression unit 200, a driving unit 400, and a resonator 500*b***.

The case 110 may have a substantially cylindrical shape.

The case 110 may include a case body 120 and a cover coupled to the case body 120.

The case body 120 may be formed in a cylindrical shape with both sides open.

The cover may be provided in plurality coupled to both end portions of the case body 120.

A suction pipe 130 through which refrigerant is sucked may be provided on a rear end portion of the case 110.

A discharge pipe 135 through which refrigerant is discharged may be provided on a front end portion of the case 110.

The compression unit 200 may include a cylinder 210 and a piston 230 reciprocating within the cylinder 210.

The cylinder 210 may be formed in a cylindrical shape with both sides open.

A frame 250 may be provided outside the cylinder 210.

The frame 250 may include a body portion 252 coupled to an outer surface of the cylinder 210, and a flange portion 254 extending in a radial direction from one end portion (front end portion) of the body portion 252.

The piston 230 may have a cylindrical shape.

The piston 230 may be provided with a head disposed on one end portion (front end portion).

The head may be provided with suction ports 234 formed therethrough in the axial direction.

The head may be provided with a suction valve 235 for opening and closing the suction ports 234.

A compression space 220 may be defined inside one end portion (front end portion) of the cylinder 210.

A suction muffler 260 may be provided on the rear of the piston 230.

The driving unit 400 may include, for example, a stator 410 and a mover 430 reciprocating with respect to the stator 410.

The stator 410 may include an outer stator 412, a stator coil 416, and an inner stator 414.

The mover 430 may include permanent magnets 432 inserted between the outer stator 412 and the inner stator 414 to perform a reciprocating motion.

A stator cover 440 and a back cover 450 may be provided at the rear of the stator 410.

A resonance spring 460 may be provided between the stator cover 440 and the back cover 450. The resonance spring 460 may include a first resonance spring 4601 and a second resonance spring 4602 spaced apart from each other in the axial direction.

A rear region of the compression unit 200 may be elastically supported by a rear elastic support portion 470.

On the other hand, a discharge cover 280 defining a discharge space 282 therein may be coupled to the front of the cylinder 210.

A discharge valve 215 for opening and closing a front opening (discharge port 212) of the cylinder 210 may be provided on the front end portion of the cylinder 210.

The discharge valve 215 may include a valve blocking the front opening of the cylinder 210, and a discharge valve spring 218 for elastically supporting the valve in the axial direction.

The discharge space 282 may include a first discharge space 2821, a second discharge space 2822, and a third discharge space 2823 partitioned from one another. The first discharge space 2821, the second discharge space 2822, and the third discharge space 2823 may be partitioned by partition walls and communicate with one another through communication holes formed through the partition walls.

A first bearing communication hole 290 may be connected to communicate with one side of the third discharge space 2823.

A loop pipe 285 having one end portion communicating with the discharge pipe 135 may have another end portion connected to communicate with another side of the third discharge space 2823.

The first bearing communication hole 290 may communicate with a second bearing communication hole 287 formed in the frame 250. The second bearing communication hole 287 may be connected to communicate with a gas groove 292 formed in the cylinder 210. The gas groove 292 may be connected to communicate with a nozzle 294 formed through the cylinder 210.

Accordingly, gas which is compressed in the compression space 220 and moved to the discharge space 282 may partially be supplied between an inner surface of the cylinder 210 and an outer surface of the piston 230 through the nozzle 294 via the second bearing communication hole 287, the first bearing communication hole 290, and the gas groove 292. Responsive to this, the piston 230 may be spaced apart from the cylinder 210, thereby reducing friction between the cylinder 210 and the piston 230.

On the other hand, the discharge cover 280 may be provided with a protrusion 2825 protruding from one end portion (front end portion) thereof in the axial direction. The protrusion 2825 may have an outer diameter reduced relative to an outer diameter of the discharge cover 280. A center line of the protrusion 2825 may be configured to be disposed on an extension line of a center line of the discharge cover 280.

A front region of the compression unit 200 may be elastically supported by a front elastic support portion 300*b*.

The front elastic support portion 300*b* may include a spring 350 for elastically supporting the discharge cover 280.

As illustrated in FIG. 16, the spring 350 may be formed in a disk shape.

The spring 350 may include a spring body 352 having a disk shape and a plurality of elastically-deformable portions 356 spirally protruding from the spring body 352 toward a center.

The spring body 352 may be provided with a plurality of coupling portions 354 formed on an outer edge thereof to be coupled to the case 110 (case body 120).

A support guide coupling portion 358 may be provided on a central region of the spring 350 to be coupled to a support guide 360 to be described later.

As illustrated in FIG. 15, a fixing piece 129 may be provided on an inner surface of the case body 120 so that a fixing member 357 coupled to the coupling portion 354 can be coupled thereto.

The fixing piece 129 may be provided in plurality spaced apart from one another in a circumferential direction of the case body 120.

The discharge cover 280 may be provided with a support guide 360 to which the spring 350 can be coupled.

The support guide 360 may be coupled to the protrusion 2825 of the discharge cover 280 to protrude along the axial direction.

On the other hand, a resonator 500*b* may be provided in one end portion (front end portion) of the case 110.

The resonator 500*b* may be formed in a disk shape.

The resonator 500*b* may include a body 510 forming a cavity 515 therein, and a hole 520 formed through the body 510 to communicate with the cavity 515.

The resonator 500*b* may be provided with a recess portion 525 recessed in the axial direction to accommodate one region of an end portion (support guide 360) of the discharge cover 280.

The recess portion 525 may be formed in a center of the resonator 500*b*.

The body 510 of the resonator 520*b* may include a blocking portion 5251 that blocks one side of the recess portion 525.

The resonator 500*b* may be formed of a synthetic resin member or steel.

The resonator 500*b* may be formed of a stainless member.

The resonator 500*b* may be coupled to the case 110 (front cover) by fixing members 530.

Accordingly, a welding operation can be excluded, thereby suppressing bad effects caused due to heat generated upon performing the welding.

Fixing member coupling portions 527 to which the fixing members 530 are coupled may be formed through the resonator 500*b*.

The fixing member coupling portions 527 may be formed through the blocking portion 5251.

On the other hand, as illustrated in FIG. 15, a movement guide 380 may be provided inside the recess portion 525.

The movement guide 380 may be connected to the discharge cover 280.

This may prevent the discharge cover 280 from moving in the radial direction.

The movement guide 380 may include, for example, an inner guide 382 and an outer guide 384 that are arranged concentrically with each other along the radial direction.

The inner guide 382 may be formed in a cap-like shape having one side open, for example.

The outer guide 384 may be formed in a cap-like shape having one side open, for example.

The inner guide 382 and the outer guide 384 may be spaced apart from each other with a preset interval w in the radial direction.

More specifically, an outer diameter of the inner guide 382 may be smaller than an inner diameter of the outer guide 384 by the preset interval w.

As a result, unnecessary contact between the inner guide 382 and the outer guide 384 can be suppressed, thereby preventing an excessive displacement of the front region (discharge cover 280) of the compression unit 200.

The inner guide 382 may be coupled to the support guide 360 by fixing members 385.

The inner guide 382, for example, may be coupled to the support guide 360 in a manner that its opening faces the front of the case 110. Accordingly, a head of the fixing member 385 may be disposed inside the inner guide 382.

The outer guide 384 may be coupled into the resonator 500*b* in a manner that its opening faces the rear of the case 110.

The outer guide 384 may be coupled to the case 110 (front cover) together with the resonator 500*b* by the fixing members 530. The outer guide 384 may be provided with fixing member insertion portions 3841 through which the fixing members 530 are inserted.

Figure 17:
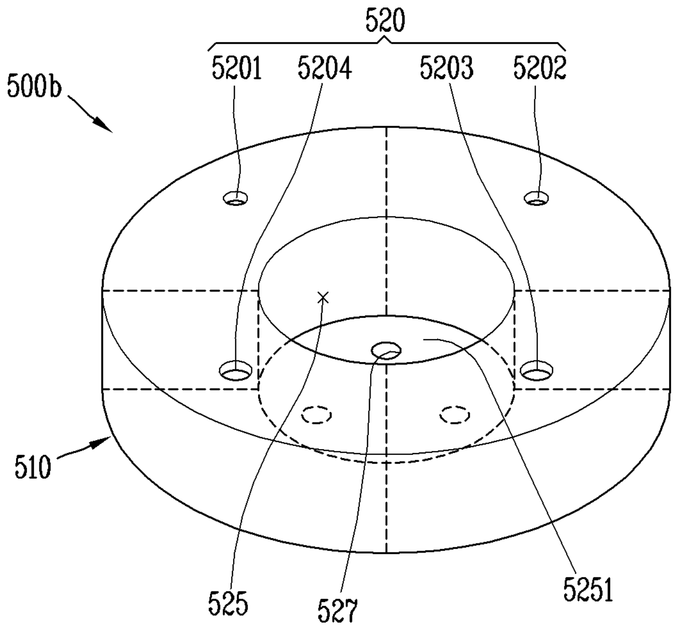
FIG. 17 is a perspective view of a resonator of FIG. 14.
Figure 18:
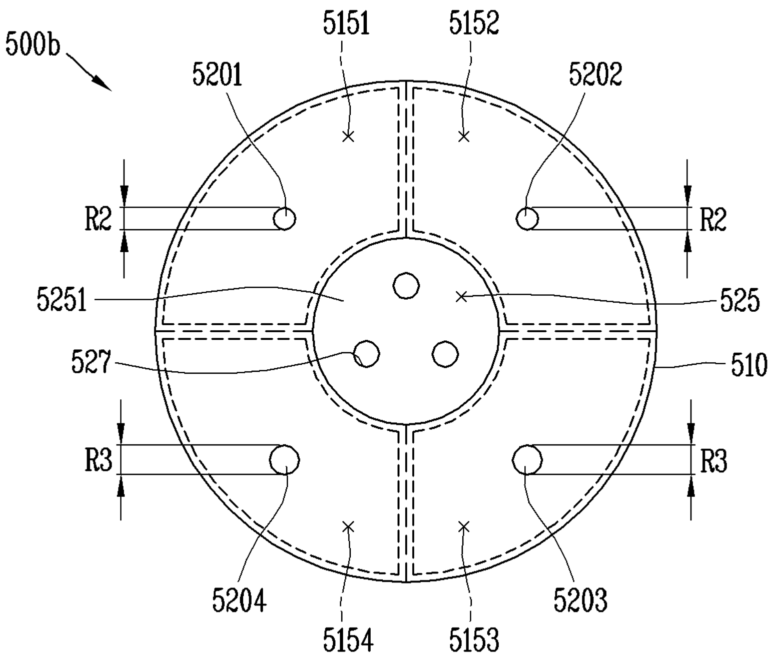
FIG. 18 is a planar view of the resonator of FIG. 17.

FIG. 17 is a perspective view of the resonator of FIG. 14, and FIG. 18 is a planar view of the resonator of FIG. 17. As illustrated in FIG. 17, the body 510 of the resonator 500*b* may be formed in an annular shape having the recess portion 525 in its center.

A plurality of cavities 515 partitioned from one another along the circumferential direction may be provided inside the body 510.

The plurality of cavities 515 may include, for example, a first cavity 5151, a second cavity 5152, a third cavity 5153, and a fourth cavity 5154.

The hole 520 may include a first hole 5201 communicating with the first cavity 5151, a second hole 5203 communicating with the second cavity 5153, a third hole 5203 communicating with the third cavity 5153, and a fourth hole 5204 communicating with the fourth cavity 5154.

In this implementation, the first cavity 5151 and the second cavity 5152 may have the same volume and may be formed symmetrically with each other. The first hole 5201 and the second hole 5202 may have the same size and may be formed symmetrically with each other.

The third cavity 5153 and the fourth cavity 5154 may have the same volume and may be formed symmetrically with each other. The third hole 5203 and the fourth hole 5204 may have the same size and may be formed symmetrically with each other.

More specifically, the first cavity 5151, the first hole 5201, the second cavity 5152, and the second hole 5202 may be configured to attenuate noises of a frequency of 250 Hz among internal noises of the case 110. Here, the first hole 5201 and the second hole 5202 may have a second diameter R2.

Accordingly, since the first cavity 5151 and the second cavity 5152 have the same volume and the symmetrical structure, the sound absorption coefficient can be remarkably increased, so that the noise of the frequency of 250 Hz can be remarkably reduced.

In addition, the third cavity 5153, the third hole 5203, the fourth cavity 5154, and the fourth hole 5204 may be configured to attenuate noise of a frequency of 315 Hz among internal noises of the case 110. Here, the third hole 5203 and the fourth hole 5204 may have a third diameter R3.

Accordingly, since the third cavity 5153 and the fourth cavity 5154 have the same volume and the symmetrical structure, the sound absorption coefficient can be remarkably increased, so that the noise of the frequency of 315 Hz can be remarkably reduced.

With this configuration, when an operation is started and power is applied to the driving unit 416, a magnetic field generated by the stator coil 416 and a magnetic field generated by the permanent magnets 432 may interact with each other, such that the mover 430 can reciprocate along the axial direction.

In response to the reciprocating motion of the mover 430, the piston 230 may reciprocate between the top dead center and the bottom dead enter.

When the piston 230 moves from the top dead center to the bottom dead center, the compression space 220 may be expanded and internal pressure may be lowered. Accordingly, the suction valve 235 may open the suction ports 234.

Gas inside the piston 230 may be sucked into the compression space 220 through the suction ports 234.

When the piston 230 moves from the bottom dead center to the top dead center, the suction valve 235 may close the suction ports 234. Responsive to this, the compression space 220 may be contracted and the gas in the compression space 220 may be compressed.

When the piston 230 reaches the top dead center and the internal pressure of the compression space 220 reaches a preset pressure, the discharge valve 215 may open the discharge port 212, such that compressed gas flows into the discharge space 282.

The gas in the discharge space 282 may flow sequentially via the first discharge space 2821, the second discharge space 2822, and the third discharge space 2823. A part of the gas flowing into the third discharge space 2823 may flow into a gap between the cylinder 210 and the piston 230 through the nozzle 294 via the first bearing communication hole 290, the second bearing communication hole 287, and the gas groove 292. Accordingly, friction between the cylinder 210 and the piston 230 can be reduced.

Another part of the gas flowing into the third discharge space 2823 may be moved to the discharge pipe 135 along the roof pipe 285 and be then discharged to the outside of the case 110.

On the other hand, among noises occurred in the case 110 during the operation of the compression unit 200 and the driving unit 400, noise of a frequency of 250 Hz which is moved along the axial direction may be attenuated by being absorbed into the first cavity 5151 and the second cavity 5152. Among the noises, noise of a frequency of 315 Hz may be attenuated by being absorbed into the third cavity 5153 and the fourth cavity 5154.

In this implementation, the noises at the frequencies of 250 Hz and 315 Hz having high noise intensities (dB), among the low-frequency noises occurred during the operation of the compression unit 200 and the driving unit 400, can be attenuated by the resonator **500*b*, thereby significantly reducing overall noise intensity inside the case 110**.

Figure 19:
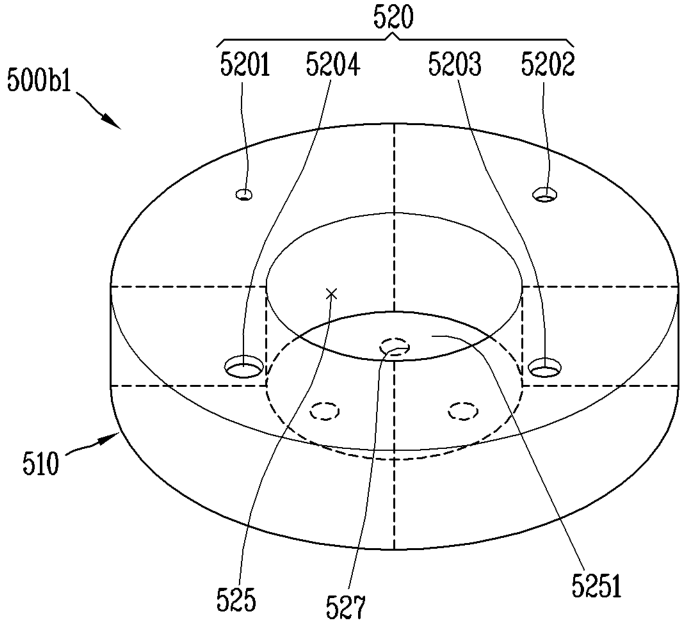
FIG. 19 is an exemplary view illustrating a variation of the resonator of FIG. 17.
Figure 20:
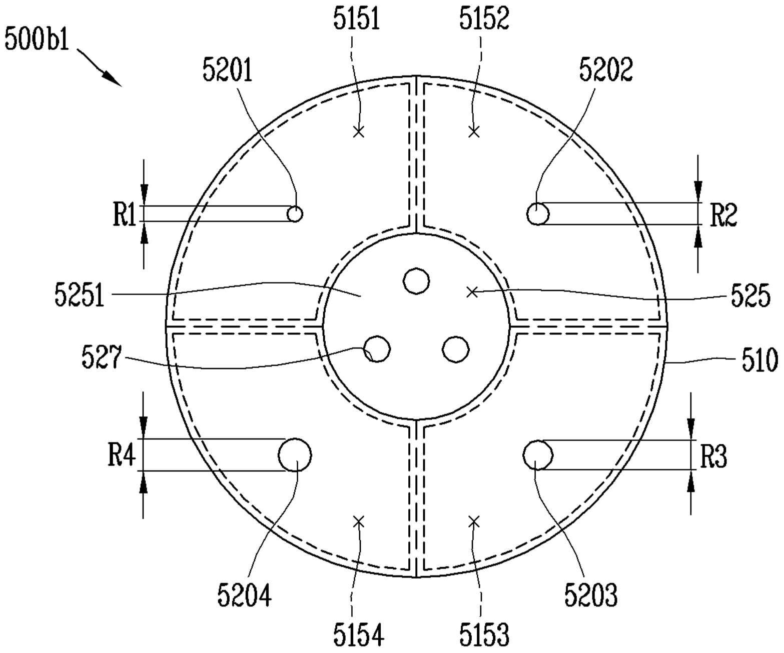
FIG. 20 is a planar view of the resonator of FIG. 19.

FIG. 19 is an exemplary view illustrating a variation of the resonator of FIG. 17, and FIG. 20 is a planar view of the resonator of FIG. 19. As illustrated in FIGS. 19 to 20, a resonator **500*b*1** may be formed substantially in a disk shape.

The resonator **500*b*1 may be provided with a recess portion 525** recessed in the axial direction.

A plurality of fixing member coupling portions 527 to which fixing members 530 are coupled may be formed through the recess portion 525. Accordingly, the resonator **500*b*1 can be coupled to an inner wall of one end portion of the case 110 by the fixing members 530**.

The resonator **500*b*1 may include a body 510 forming a cavity 515 therein and a hole 520 formed through the body 510 to communicate with the cavity 515**.

The cavity 515 may include, for example, a first cavity 5151, a second cavity 5152, a third cavity 5153, and a fourth cavity 5154 partitioned from one another inside the body 510.

The hole 520 may include a first hole 5201, a second hole 5202, a third hole 5203, and a fourth hole 5204 communicating with the first to fourth cavities 5151 to 5154, respectively.

In this implementation, the first hole 5201, the second hole 5202, the third hole 5203, and the fourth hole 5204 may be implemented in different sizes.

This may result in attenuating noises of four different frequencies, respectively.

More specifically, the first hole 5201 may have the smallest size (first diameter R1), the second hole 5202 may have a larger size (second diameter R2) than the first hole 5201, the third hole 5203 may have a larger size (third diameter R3) than the second hole 5202, and the fourth hole 5204 may have a larger size (fourth diameter R4) than the third hole 5203.

The first cavity 5151 and the first hole 5201 may be configured to attenuate noise of a frequency of 200 Hz among internal noises of the case 110 of the compressor **100*b***.

The second cavity 5152 and the second hole 5202 may reduce noise of a frequency of 250 Hz.

The third cavity 5153 and the third hole 5203 may reduce noise of a frequency of 315 Hz.

The fourth cavity 5154 and the fourth hole 5204 may reduce noise of a frequency of 400 Hz.

With this configuration, among noises generated in the case 110 during the operation of the compression unit 200 and the driving unit 400, the noises at the four frequencies of 250 Hz, 315 Hz, 200 Hz, and 400 Hz, which have high noise intensities can be reduced, thereby significantly reducing overall noises generated in the case 110.

Figure 21:
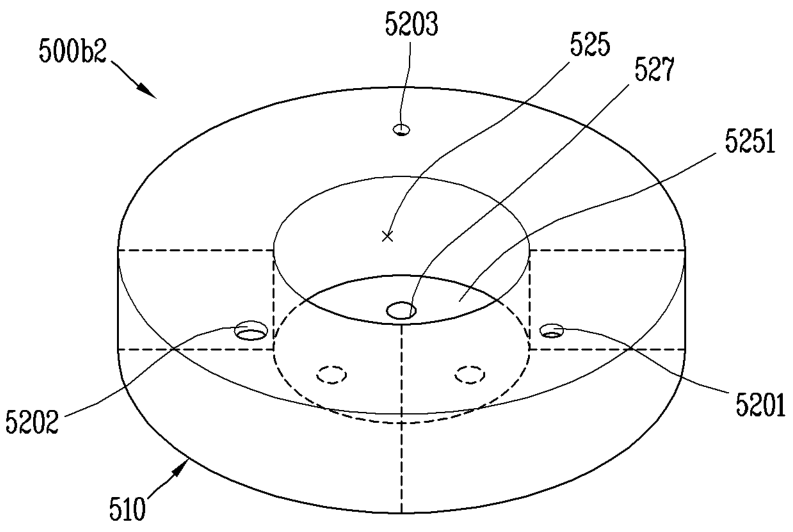
FIG. 21 is an exemplary view illustrating a variation of the resonator of FIG. 17.
Figure 22:
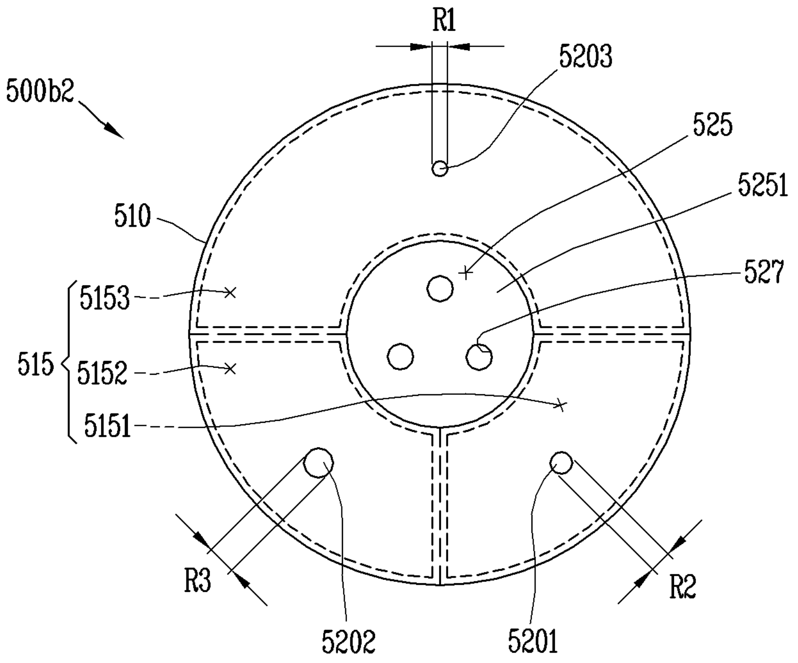
FIG. 22 is a planar view of the resonator of FIG. 21.

FIG. 21 is an exemplary view illustrating a variation of the resonator of FIG. 17, and FIG. 22 is a planar view of the resonator of FIG. 21. As illustrated in FIGS. 21 to 22, a resonator **500*b*2** may be formed substantially in a disk shape.

The resonator **500*b*2 may be provided with a recess portion 525** recessed in the axial direction.

A plurality of fixing member coupling portions 527 to which fixing members 530 are coupled may be formed through the recess portion 525.

The resonator **500*b*2 may include a body 510 forming a cavity 515 therein and a hole 520 formed through the body 510 to communicate with the cavity 515**.

The cavity 515 may include, for example, a first cavity 5151, a second cavity 5152, and a third cavity 5153 partitioned from one another inside the body 510 in the circumferential direction.

The hole 520 may include a first hole 5201, a second hole 5202, and a third hole 5203 communicating with the first to third cavities 5151 to 5153, respectively.

In this implementation, the first hole 5201, the second hole 5202, and the third hole 5203 may be implemented in different sizes.

This may result in attenuating noises of three different frequencies, respectively.

In more detail, the third hole 5203 may have the smallest size (first diameter R1), the first hole 5201 may have a larger size (second diameter R2) than the third hole 5203, and the second hole 5202 may have a larger size (third diameter R3) than the first hole 5201.

In this implementation, the third cavity 5153, through which the third hole 5203 having the smallest size (first diameter R1) is formed, may have the largest volume compared to the first cavity 5151 and the second cavity, for example.

The second cavity 5152 and the third cavity 5153 may have the same volume.

This implementation illustrates the case where the third cavity 5153 has a volume corresponding to half the volume of the body 510, but this is merely illustrative. The third cavity 5153 may alternatively be configured to have a volume larger or smaller than half the volume of the body 510.

In addition, the case where the second cavity 5152 and the third cavity 5153 have the same volume is illustrated, but the first cavity 5151 having the first hole 5201 with the relatively small size may alternatively have a volume larger than the volume of the second cavity 5152.

In more detail, the third cavity 5153 and the third hole 5203 may be configured to attenuate noise of a frequency of 200 Hz among internal noises of the case 110 of the compressor 100*b*.

The first cavity 5151 and the first hole 5201 may reduce noise of a frequency of 250 Hz.

The second cavity 5152 and the second hole 5202 may reduce noise of a frequency of 315 Hz.

With this configuration, among noises generated in the case 110 during the operation of the compression unit 200 and the driving unit 400, the noises of the three frequencies of 250 Hz, 315 Hz, and 200 Hz, which have high noise intensities, can be reduced, thereby significantly reducing overall noises generated in the case 110.

Figure 23:
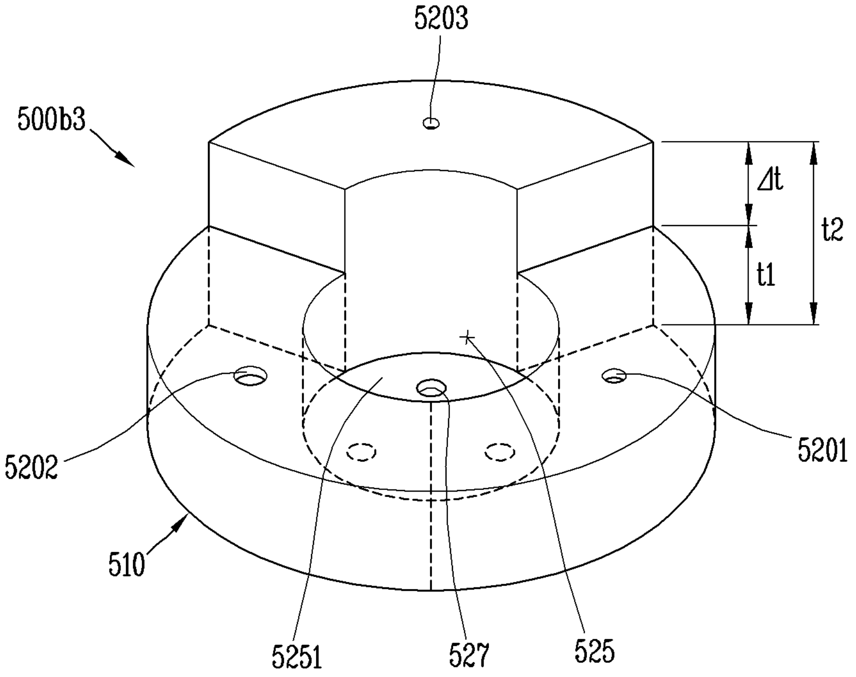
FIG. 23 is an exemplary view illustrating a variation of the resonator of FIG. 17.
Figure 24:
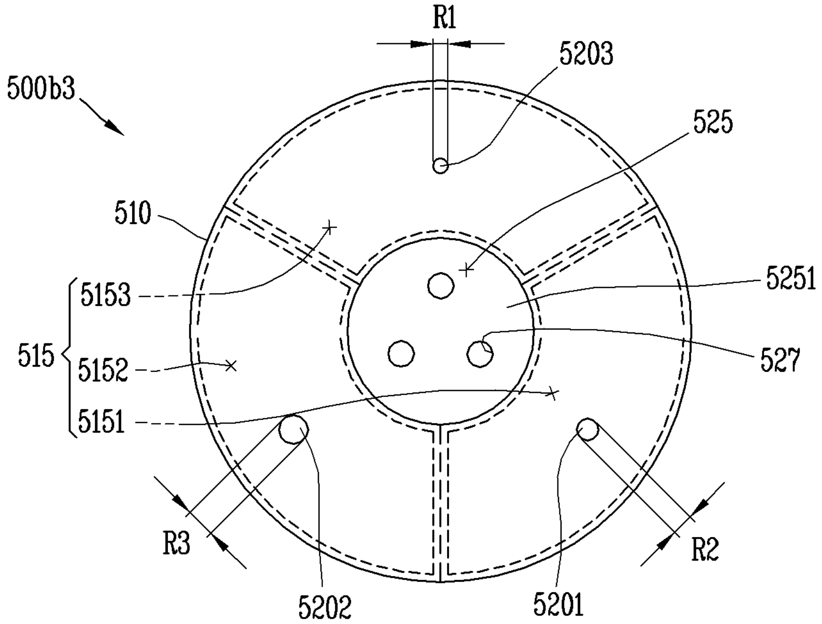
FIG. 24 is a planar view of the resonator of FIG. 23.

FIG. 23 is an exemplary view illustrating a variation of the resonator of FIG. 17, and FIG. 24 is a planar view of the resonator of FIG. 23. As illustrated in FIGS. 23 to 24, a resonator 500*b*3 may be formed substantially in a disk shape.

The resonator 500*b*3 may be provided with a recess portion 525 recessed in the axial direction.

A plurality of fixing member coupling portions 527 to which fixing members 530 are coupled may be formed through the recess portion 525.

The resonator 500*b*3 may include a body 510 forming a cavity 515 therein and a hole 520 formed through the body 510 to communicate with the cavity 515.

The cavity 515 may include, for example, a first cavity 5151, a second cavity 5152, and a third cavity 5153 partitioned from one another inside the body 510 in the circumferential direction.

The hole 520 may include a first hole 5201, a second hole 5202, and a third hole 5203 communicating with the first to third cavities 5151 to 5153, respectively.

In this implementation, the first hole 5201, the second hole 5202, and the third hole 5203 may be implemented in different sizes.

This may result in attenuating noises of three different frequencies, respectively.

In more detail, the third hole 5203 may have the smallest size (first diameter R1), the first hole 5201 may have a larger size (second diameter R2) than the third hole 5203, and the second hole 5202 may have a larger size (third diameter R3) than the first hole 5201.

In this implementation, the first cavity 5151, the second cavity 5152, and the third cavity 5153 may be configured, for example, to have the same internal angle between connection lines connecting both ends in the circumferential direction and the center of the cavity 515.

That is, the internal angle between both ends of the first cavity 5151, the internal angle between both ends of the second cavity 5152, and the internal angle between both ends of the third cavity 5153 may all be 120 degrees.

On the other hand, in this implementation, the third cavity 5153, through which the third hole 5203 having the smallest size (first diameter R1) is formed, may have the largest volume compared to the first cavity 5151 and the second cavity.

The third cavity 5153 having the third hole 5203 may more protrude toward the compression unit 200 in the axial direction than the first cavity 5151 and the second cavity 5152.

Accordingly, the third cavity 5153 configured to reduce noise of a relatively lower frequency may be increased in volume, thereby improving noise reduction characteristics.

A thickness t2 of the third cavity 5153 may be set to be thicker than a thickness t1 of the first cavity 5151 and the second cavity 5152 by a preset thickness Δt.

In this implementation, the case where the second cavity 5152 and the third cavity 5153 have the same volume is illustrated, but this is merely illustrative. The first cavity 5151 having the first hole 5201 with the relatively small size may alternatively have a volume larger than the volume of the second cavity 5152.

In more detail, the third cavity 5153 and the third hole 5203 may be configured to attenuate noise of a frequency of 200 Hz among internal noises of the case 110 of the compressor 100*b*.

The first cavity 5151 and the first hole 5201 may reduce noise of a frequency of 250 Hz.

The second cavity 5152 and the second hole 5202 may reduce noise of a frequency of 315 Hz.

With this configuration, among noises generated in the case 110 during the operation of the compression unit 200 and the driving unit 400, the noises of the three frequencies of 250 Hz, 315 Hz, and 200 Hz, which have high noise intensities, can be reduced, thereby significantly reducing overall noises generated in the case 110.

The foregoing description has been given of specific implementations of the present disclosure. However, the present disclosure may be embodied in various forms without departing from the spirit or essential characteristics thereof, and thus the above-described implementations should not be limited by the details of the detailed description.

In addition, even implementations not listed in the detailed description should be interpreted within the scope of the technical idea defined in the appended claims. It is intended that the present disclosure cover the modifications and variations of this invention provided they come within the scope of the appended claims and their equivalents.

What is claimed is:

1. A compressor comprising:

a case;

a compression unit that is provided inside the case and that includes a cylinder and a piston configured to reciprocate inside the cylinder to compress refrigerant;

a driving unit that includes a stator disposed inside the case and a plurality of permanent magnets configured to reciprocate with respect to the stator and that is configured to provide a driving force to the compression unit; and a resonator that is configured to reduce noises generated while the compression unit is operated, that is disposed between the compression unit and an inner surface of the case facing the compression unit in an axial direction, and that is spaced apart from the compression unit, wherein the compression unit comprises a discharge cover surrounding a discharge port configured to discharge the compressed refrigerant from the cylinder, wherein the compressor further comprises (i) a loop pipe that is connected to the discharge cover and (ii) a discharge pipe that is in fluid communication with one end portion of the loop pipe, wherein the resonator is spaced apart from the compression unit and coupled to an inner wall of a first end portion of the case by a fixing member, wherein the resonator comprises:

a body defining a cavity therein, a hole that is defined at the body and that is in fluid communication with the cavity, the hole being defined at a side of the body facing the compression unit in the axial direction, and a recess portion that is recessed to accommodate a region of an end portion of the discharge cover, and wherein the body is disposed along a circumferential direction of the recess portion.

2. The compressor of claim 1, wherein the resonator includes a fixing member coupling portion to which the fixing member is coupled.

3. The compressor of claim 1, wherein the recess portion is defined at a center of the resonator, and wherein the recess portion includes a fixing member coupling portion that is configured to couple the resonator to the case.

4. The compressor of claim 3, wherein the recess portion includes a movement guide that is configured to suppress the end portion of the discharge cover from moving in a radial direction, and wherein the movement guide defines a fixing member insertion portion into which the fixing member is inserted, the fixing member insertion portion being in fluid communication with the fixing member coupling portion.

5. The compressor of claim 4, wherein the movement guide comprises (i) an outer guide that has a cap-like shape defining an opening at a first side and that is coupled to the recess portion and (ii) an inner guide that has a size less than a size of the outer guide, that is coupled to the end portion of the discharge cover, and that is disposed inside the outer guide, and wherein the fixing member insertion portion is defined at the outer guide.

6. The compressor of claim 4, further comprising a buffer member that is coupled to the discharge cover and that is configured to, based on the discharge cover being moved in the radial direction, apply resistance to buffer the discharge cover, and wherein the case includes a buffer member coupling portion to which the buffer member is coupled.

7. The compressor of claim 4, wherein the cavity is provided in plurality partitioned from one another in the circumferential direction inside the body, and wherein the body is provided with a plurality of holes that are in fluid communication with the plurality of cavities, respectively.

8. The compressor of claim 7, wherein the plurality of holes have different inner diameters from each other.

9. The compressor of claim 8, wherein one of the plurality of cavities having a hole with a smallest inner diameter among the plurality of holes protrudes further toward the compression unit in the axial direction compared to the other cavities.

10. The compressor of claim 7, wherein the plurality of cavities include a first cavity, a second cavity, a third cavity, and a fourth cavity, wherein the plurality of holes include a first hole, a second hole, a third hole, and a fourth hole, and wherein the first cavity, the first hole, the second cavity, and the second hole have a symmetrical structure, and the third cavity, the third hole, the fourth cavity, and the fourth hole have a symmetrical structure.

11. The compressor of claim 1, wherein the discharge cover includes a supporter at an end portion that supports the discharge cover, and wherein the resonator defines a supporter accommodating portion in which the supporter is accommodated.

12. The compressor of claim 11, wherein the supporter includes (i) a contact portion that is in contact with the end portion of the discharge cover and (ii) a plurality of rod parts protruding from the contact portion toward an inner wall of the case to form a preset internal angle.

13. The compressor of claim 11, wherein the body comprises an upper body that is located above the supporter accommodating portion and a lower body that is located below the supporter accommodating portion, wherein the cavity includes (i) a first cavity and a second cavity that are defined in the upper body and that are partitioned from each other and (ii) a third cavity defined in the lower body, and wherein the hole includes a first hole that is in fluid communication with the first cavity, a second hole that is in fluid communication with the second cavity, and a third hole that is in fluid communication with the third cavity.

14. The compressor of claim 13, wherein the first cavity and the second cavity are symmetrical with each other, and the first hole and the second hole are symmetrical with each other.

15. The compressor of claim 13, wherein a size of the third hole is smallest among the first hole, the second hole, and the third hole, a size of the first hole is larger than the size of the third hole, and a size of the second hole is larger than the size of the first hole.

16. The compressor of claim 13, wherein one of the first cavity, and the second cavity, and the third cavity that has a hole with a smallest size, among the first hole, the second hole, and the third hole, protrudes further toward the compression unit in the axial direction compared to the other cavities.

17. The compressor of claim 1, wherein the resonator is made of a synthetic resin member or a steel member.

18. The compressor of claim 1, wherein the cylinder includes a nozzle that is configured to spray gas into a gap between the cylinder and the piston.

19. The compressor of claim 18, wherein an outer surface of the cylinder includes a gas groove, and wherein the nozzle is connected to the gas groove.

* * * * *